United States Patent
Lee et al.

(10) Patent No.: US 11,165,901 B2
(45) Date of Patent: Nov. 2, 2021

(54) ELECTRONIC DEVICE AND CONTROL METHOD FOR PROVIDING SECURITY NOTIFICATION

(71) Applicant: Samsung Electronics Co., Ltd., Suwon-si (KR)

(72) Inventors: Jin-Yeong Lee, Suwon-si (KR); Sang-Im Yu, Seoul (KR); Ga-Jin Song, Anyang-si (KR); Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/733,055

(22) PCT Filed: Oct. 17, 2018

(86) PCT No.: PCT/KR2018/012269
§ 371 (c)(1),
(2) Date: May 1, 2020

(87) PCT Pub. No.: WO2019/088518
PCT Pub. Date: May 9, 2019

(65) Prior Publication Data
US 2021/0099564 A1    Apr. 1, 2021

(30) Foreign Application Priority Data
Nov. 1, 2017  (KR) .................. 10-2017-0144863

(51) Int. Cl.
*H04M 1/72412*    (2021.01)
*H04M 1/72436*    (2021.01)
(Continued)

(52) U.S. Cl.
CPC ...... *H04M 1/72412* (2021.01); *G06F 3/0488* (2013.01); *G06F 3/04817* (2013.01);
(Continued)

(58) Field of Classification Search
CPC ......... H04M 1/72412; H04M 1/72436; H04M 1/72451; G06F 3/04817; G06F 3/0488; G06F 3/1423; G06F 21/62
(Continued)

(56) References Cited

U.S. PATENT DOCUMENTS 9,241,062 B2 * 1/2016 Khalid .................. G06F 3/0481
2003/0025678 A1 * 2/2003 Lee .......................... G09G 5/08
345/173
(Continued)

FOREIGN PATENT DOCUMENTS

KR    10-2013-0023415 A    3/2013
KR       10-1418286 B1     7/2014
(Continued)

OTHER PUBLICATIONS

International Search Report and Written Opinion of the International Searching Authority in connection with International Application No. PCT/KR2018/012269 dated Jan. 24, 2019, 21 pages.

*Primary Examiner* — William Nealon

(57) ABSTRACT

Disclosed are an electronic device and a control method for providing a security screen. In an electronic device according to various embodiments of the present document, when a specific application-associated event occurs in the electronic device while the electronic device is being connected to an external electronic device, a notification of event-associated information except for privacy information is provided through the external electronic device, so that a situation in which the privacy information stored in the electronic device is exposed to another user can be prevented.

15 Claims, 40 Drawing Sheets

(51) Int. Cl.
*H04M 1/72451* (2021.01)
*G06F 3/0481* (2013.01)
*G06F 3/14* (2006.01)
*G06F 21/62* (2013.01)
*G06F 3/0488* (2013.01)

(52) U.S. Cl.
CPC ............ *G06F 3/1423* (2013.01); *G06F 21/62* (2013.01); *H04M 1/72436* (2021.01); *H04M 1/72451* (2021.01)

(58) Field of Classification Search
USPC .......................................... 455/411
See application file for complete search history.

(56) References Cited

U.S. PATENT DOCUMENTS

| | | | |
|---|---|---|---|
| 2006/0085753 A1* | 4/2006 | Vance | H04M 1/72412 715/753 |
| 2007/0136466 A1 | 6/2007 | Etelapera | |
| 2009/0061841 A1* | 3/2009 | Chaudhri | H04L 65/1059 455/420 |
| 2010/0138780 A1* | 6/2010 | Marano | G06F 3/147 715/804 |
| 2011/0138416 A1* | 6/2011 | Kang | H04N 21/42208 725/39 |
| 2012/0040720 A1* | 2/2012 | Zhang | G06F 3/1454 455/557 |
| 2013/0232437 A1* | 9/2013 | Kim | G06F 3/048 715/773 |
| 2015/0334457 A1 | 11/2015 | Chandel et al. | |
| 2016/0241706 A1 | 8/2016 | Ziemianska et al. | |

FOREIGN PATENT DOCUMENTS

| | | |
|---|---|---|
| KR | 10-1520686 B1 | 5/2015 |
| KR | 10-2016-0031724 A | 3/2016 |
| KR | 10-2016-0092363 A | 8/2016 |
| KR | 10-2017-0004481 A | 1/2017 |
| KR | 10-2017-0007980 A | 1/2017 |

* cited by examiner

ELECTRONIC DEVICE AND CONTROL METHOD FOR PROVIDING SECURITY NOTIFICATION

CROSS-REFERENCE TO RELATED APPLICATIONS

This application is a National Phase Entry of PCT international Application No. PCT/KR2018/012269, which was filed on Oct. 17, 2018, and claims priority to Korean Patent Application No. 10-2017-0144863 filed on Nov. 1, 2017, in the Korean Intellectual Property Office, the contents of which are incorporated herein by reference.

BACKGROUND

1. Field

The disclosure relates to an electronic device and control method of providing a security screen.

2. Description of Related Art

Smartphones or other portable electronic devices are quickly spreading while replacing conventional electronic devices, such as personal computers, laptop computers, etc. More and more users prefer smartphones to desktop PCs for the purposes of saving and using files. Files stored in a smartphone sometimes need to be run or modified on a desktop PC. There are being developed various techniques for connecting smartphones to desktop PCs or monitors to allow them to be used in a similar environment to that of the desktop PC.

SUMMARY

An electronic device (e.g., a smartphone) may connect to an external electronic device (e.g., a monitor). For example, the electronic device may connect to the external electronic device via a sub electronic device (e.g., a docking station). The electronic device may provide various functions to the user via the external electronic device connected with the electronic device. For example, the user may provide various pieces of information to another user via a monitor which has a relatively larger display device than the display of the smartphone. If an event (e.g., receiving a call) associated with a specific application occurs on the electronic device while providing information to the other user, information (e.g., time of calling, caller's information (caller's name or phone number), text, and various graphical user interfaces (GUIs)) associated with the event may be provided to the other user via the external electronic device. In this case, regardless of the user's intent, privacy information (e.g., caller information) may also be provided to the other user via the external electronic device.

According to various embodiments of the disclosure, there is provided an electronic device that, when an event associated with a specific application occurs on the electronic device while in connection with an external electronic device, allows a notification with no privacy information among the event-associated pieces of information to be provided via the external electronic device.

According to various embodiments of the disclosure, there is provided an electronic device that, when an event associated with a specific application occurs on the electronic device while in connection with an external electronic device, allows the event-associated information to be provided to the user via the electronic device as well as via the external electronic device.

According to various embodiments of the disclosure, there is provided a computer readable recording medium storing instructions that, when an event associated with a specific application occurs on the electronic device while in connection with an external electronic device, allow a notification with no privacy information among the event-associated pieces of information to be provided via the external electronic device.

According to various embodiments of the disclosure, there is provided a computer readable recording medium storing instructions that, when an electronic device is connected with an external electronic device via a sub electronic device, allow various screens to be provided to the user via the electronic device as well as via the external electronic device.

According to various embodiments of the disclosure, an electronic device comprises a housing including a first surface and a second surface facing away from the first surface, a touchscreen display exposed through a portion of the first surface, at least one wireless and/or wired communication circuit disposed in the housing, at least one processor electrically connected with the communication circuit and the display and disposed in the housing, and a memory electrically connected with the processor and disposed in the housing, wherein the memory is configured to store a plurality of application programs including a first application program, and wherein the memory stores instructions that, when executed, enable the processor to, while the electronic device is not in electrical connection with an external display device, display a first plurality of icons indicating the plurality of application programs on the touchscreen display without displaying a bar and, when there is an event associated with the first application program, display a first notification including the text based on the event on the touchscreen display, and while the electronic device is in electrical connection with the external display device via the communication circuit, enable the external display to display the first plurality of icons and bar, when there is the event associated with the first application program, in a first operation, enable the external display to display a second notification, at least partially, at an outside of the bar, the second notification appropriate for the external display and including the event-based text, in a second operation, enable the external display to display a third notification indicating the event but not including the event-based text.

According to various embodiments of the disclosure, a computer-readable recording medium may include at least one operation that may include, while an electronic device is not in electrical connection with an external display device, displaying a first plurality of icons indicating a plurality of application programs on a touchscreen display of the electronic device without displaying a bar and, when there is an event associated with a first application program, displaying a first notification including text based on the event on the touchscreen display, and while the electronic device is in electrical connection with the external display device, enabling the external display device to display the first plurality of icons and bar, when there is the event associated with the first application program, in a first operation, enabling the external display device to display a second notification, at least partially, at an outside of the bar, the second notification appropriate for the external display device and including the event-based text, in a second operation, enabling the external display device to display a third notification indicating the event but not including the event-based text.

According to various embodiments of the disclosure, an electronic device comprises a housing including a first surface and a second surface facing away from the first surface, a touchscreen display exposed through a portion of the first surface, at least one wireless and/or wired communication circuit disposed in the housing, at least one processor electrically connected with the communication circuit and the display and disposed in the housing, and a memory electrically connected with the processor and disposed in the housing, wherein the memory is configured to store a plurality of application programs including a first application program, and wherein the memory stores instructions that, when executed, enable the processor to, while the electronic device is in electrical connection with an external display device via the communication circuit, enable the external display device to display at least one icon and bar, when there is an event associated with the first application program, enable the external display device to display a first notification indicating the event but not including the event-based text, and display a second notification including the event-based text on the touchscreen display.

According to various embodiments of the disclosure, when an event associated with a specific application occurs on the electronic device while in connection with an external electronic device, a notification with no privacy information among the event-associated pieces of information may be provided via the external electronic device, thus preventing privacy information stored in the electronic device from being exposed to other users.

According to various embodiments of the disclosure, when an electronic device is connected with an external electronic device via a sub electronic device, various screens may be provided to the user via the electronic device, enhancing user convenience.

The effects set forth herein are not limited thereto, and it is apparent to one of ordinary skill in the art that various effects may be disclosed herein.

DETAILED DESCRIPTION

The terms coming with ordinal numbers such as 'first' and 'second' may be used to denote various components, but the components are not limited by the terms. The terms are used to distinguish one component from another. For example, a first component may be denoted a second component, and vice versa without departing from the scope of the present disclosure. The term "and/or" may denote a combination(s) of a plurality of related items as listed or any of the items.

Figure 1:
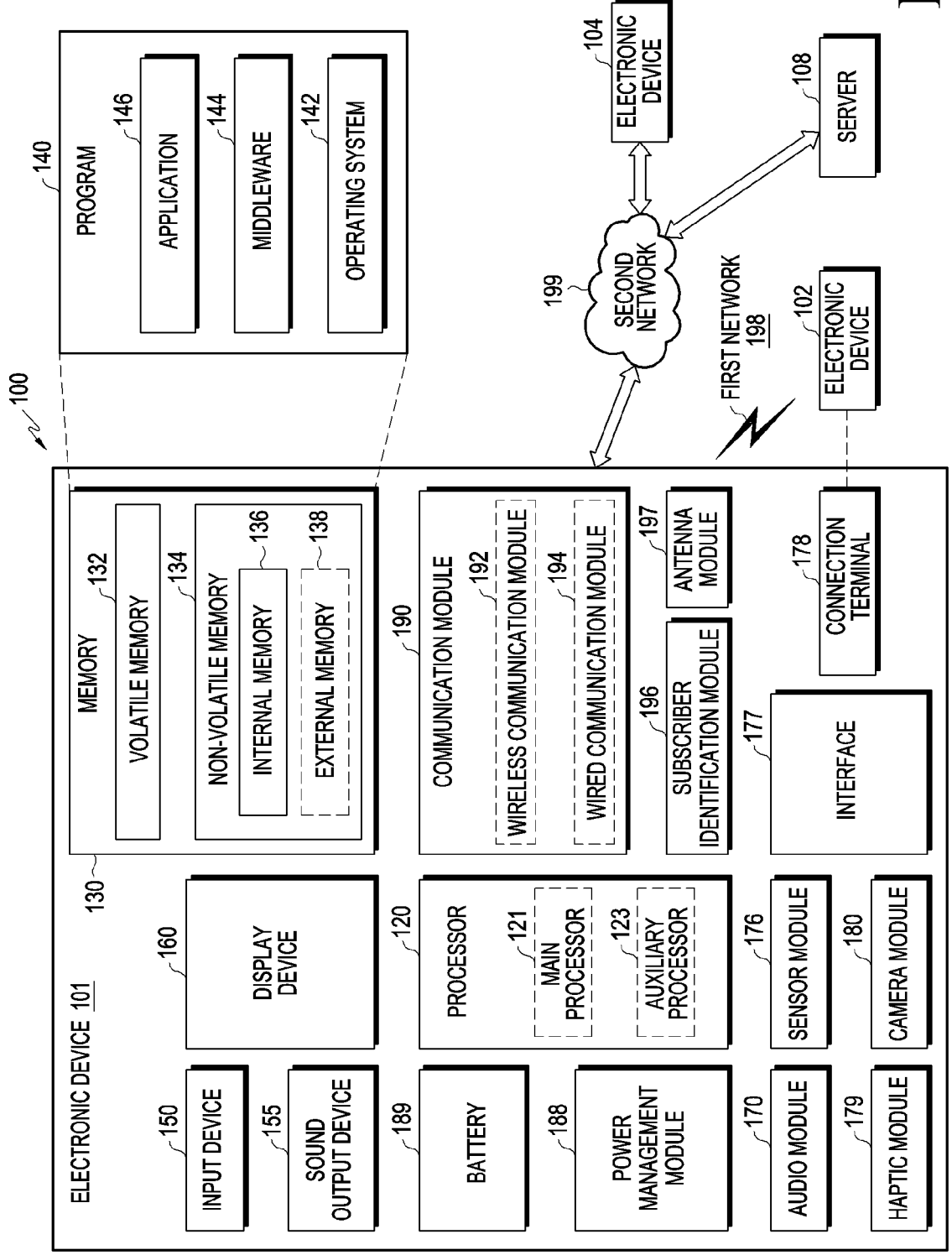
FIG. 1 is a view illustrating an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
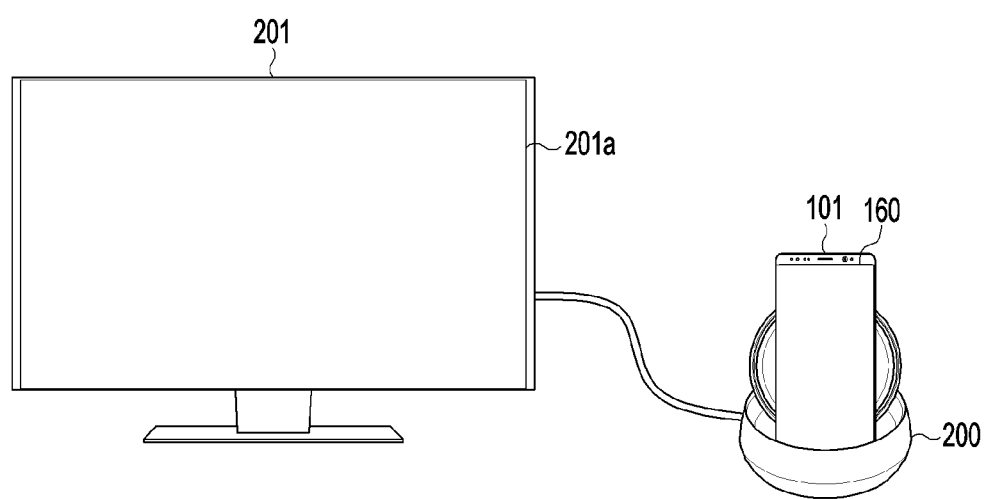
FIG. 2A is a view illustrating a state of an electronic device being connected with an external electronic device via a sub electronic device according to various embodiments.

FIG. 2A is a view illustrating a state of an electronic device being connected with an external electronic device via a sub electronic device according to various embodiments.

Referring to FIG. 2A, according to various embodiments of the disclosure, an electronic device 101 may be electrically connected with a sub electronic device 200. According to various embodiments of the disclosure, the electronic device 101 may include a display device 160 (e.g., a display). FIG. 2A illustrates an example in which a docking station (e.g., Samsung Dex™) serves as the sub electronic device 200. The electronic device 101 and the sub electronic device 200 may be electrically connected with each other via a connector. An external electronic device 201 (e.g., a monitor) may be electrically connected with the sub electronic device 200 and the electronic device 101 via the connector of the sub electronic device 200, with the electronic device 101 in connection with the sub electronic device 200. According to various embodiments of the disclosure, the external electronic device 201 may include a display device 201a (e.g., a display).

Figure 2B:
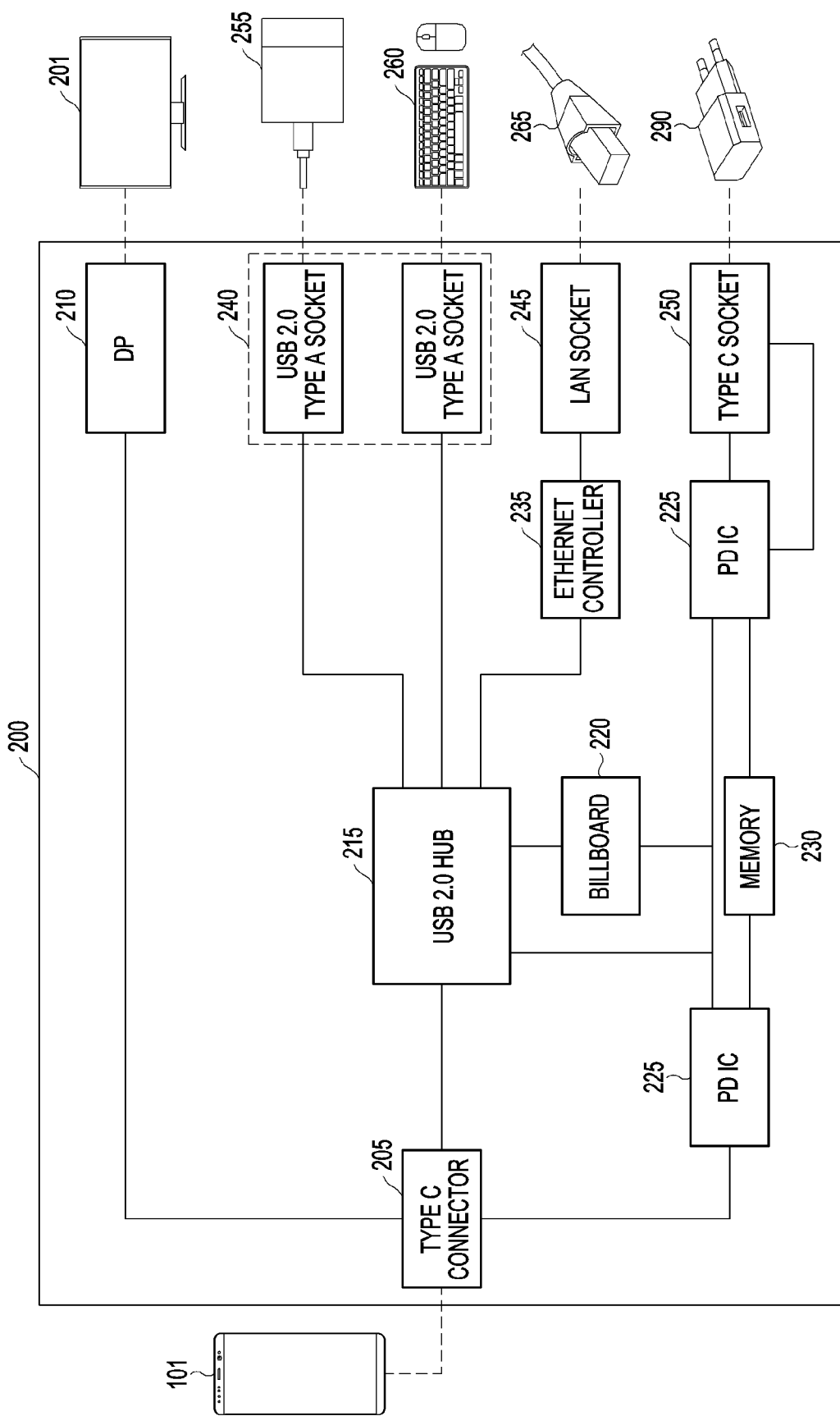
FIG. 2B is a view illustrating an example sub electronic device according to various embodiments.

FIG. 2B is a view illustrating an example sub electronic device according to various embodiments.

Referring to FIG. 2B, according to various embodiments of the disclosure, the sub electronic device 200 may include a type C connector 205, a display port (DP) 210, a USB 2.0 hub 215, a billboard 220, a power delivery (PD) IC 225, a memory 230, an Ethernet controller 235, a USB 2.0 type A socket 240, a LAN socket 245, and a type C socket 250. According to various embodiments of the disclosure, the type C connector 205 may include a USB type C connector. According to various embodiments of the disclosure, the type C socket 250 may mean a USB type C socket. In FIG. 2B, the USB 2.0 hub 215 is shown as an example of USB hub, but this is merely an example. According to various embodiments of the disclosure, the USB 2.0 hub 215 may be used interchangeably/alternatively with various types of (or versions of) USB hubs (e.g., USB 3.0 hub) or various types of USB hubs (e.g., USB 3.0 hub) may be additionally used.

According to various embodiments of the disclosure, the type C connector 205 may include a USB type and connect to the electronic device 101. According to various embodiments of the disclosure, the display port 210 may connect to the type C connector 205. It may be connected with the external electronic device 201 (e.g., a monitor) via the display port 210. The USB 2.0 hub 215 may be connected with the type C connector 205. The USB 2.0 hub 215 may be connected with the USB type A socket 240 and the LAN socket 245. According to various embodiments, the billboard 220 may be connected with the USB 2.0 hub 215. The billboard 220 may receive identification information for identifying the external electronic device (e.g., a monitor) connected with the sub electronic device 200 from the external electronic device. The billboard 220 may transmit the received external electronic device identification information to the electronic device 101. According to various embodiments of the disclosure, the PD IC 225 may be connected with the type C socket 250. The PD IC 225, when connected with an external power source 290 via the type C socket 250, may receive power from the external power source 290 and provide the power to various components of the sub electronic device 200. According to various embodiments of the disclosure, the memory 230 may store various pieces of information associated with the operation of the sub electronic device 200, such as identification information for the sub electronic device 200. According to various embodiments of the disclosure, the Ethernet controller 235, when connected with a communication cable 265 via the LAN socket 245, may establish a communication channel and support communication via the established communication channel. According to various embodiments of the disclosure, it may be connected with various external electronic devices (e.g., a keyboard 260 or external memory 255) via the USB 2.0 type A socket 240. The types of sockets, types of connectors and types of ports shown in FIG. 2B, according to various embodiments of the disclosure, are merely an example, and they may be replaced with other various types or schemes. According to various embodiments of the disclosure, the term "port" or "socket" may be used interchangeably/alternatively with 'connector.' FIG. 2C is a view illustrating an example connector of a sub electronic device according to various embodiments.

Figure 2C:
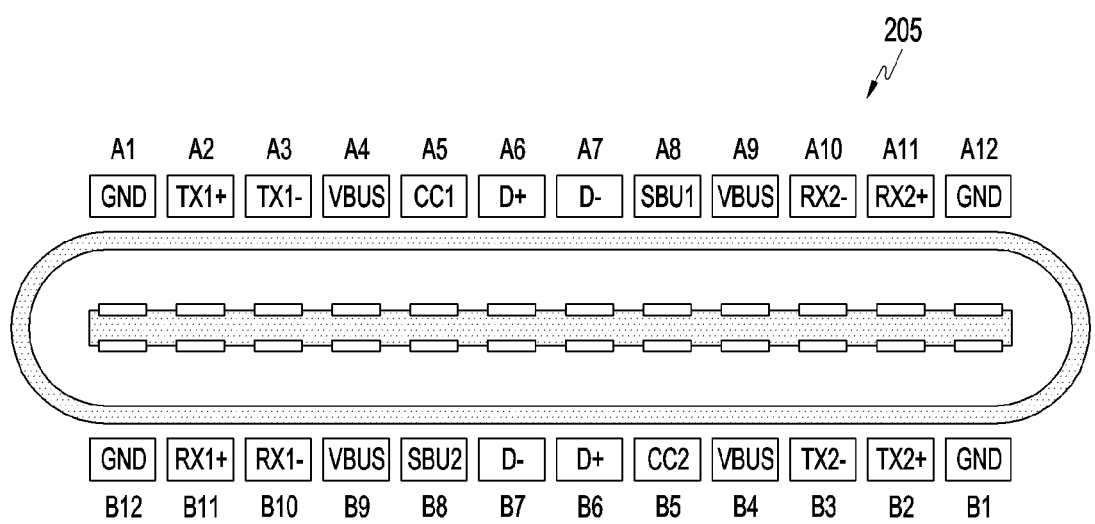
FIG. 2C is a view illustrating an example connector of a sub electronic device according to various embodiments.

The connector shown in FIG. 2C may include, e.g., the type C connector 205 shown in FIG. 2B. According to various embodiments of the disclosure, the connector shown in FIG. 2C may be configured with the type C socket 250. According to various embodiments of the disclosure, it is assumed in FIG. 2C that the connector (e.g., the USB type C connector) of the electronic device 101 and the type C connector 205 of the sub electronic device 200 are connected together.

According to various embodiments of the disclosure, the type C connector 250 may include a number of pins. Referring to FIG. 2C, the pins of the type C connector of the electronic device 101 may include a ground (GND)(A1), a TX1+(A2) and a TX1−(A3) for data communication, a VBUS(A4) for power supply, a CC1(A5) for configuring a channel, a D+(A6) and D−(A7) for data transmission/reception, an SBU1(A8) for use of sideband, a VBUS(A9) for power supply, an RX2−(A10) and RX2+(A11) for data reception, and a ground (GND)(A12).

According to various embodiments, the pins of the type C connector 205 of the sub electronic device 200 may include a (GND)(B12), an RX1+(B11) and RX1−(B10) for data reception, a VBUS(B9) for power supply, an SBU2(B8) for use of sideband, a D−(B7) and D+(B6) for data transmission/reception (e.g., high-speed communication), a CC2(B5) for configuring a channel, a VBUS(B4) for power supply, a TX2−(B3) and TX2+(B2) for data transmission, and a ground (GND)(B1).

According to various embodiments of the disclosure, the ground A1 of the type C connector of the electronic device 101 may be connected with the ground B12 of the type C connector 205 of the sub electronic device 200. The ground A12 of the type C connector of the electronic device 101 may be connected with the ground B1 of the type C connector 205 of the sub electronic device 200. The TX+ (A2) of the type C connector of the electronic device 101 may be connected with the RX+(B11) of the type C connector 205 of the sub electronic device 200. The TX−(A3) of the type C connector of the electronic device 101 may be connected with the RX−(B10) of the type C connector 205 of the sub electronic device 200. Thus, data transmission/reception may be possible between the electronic device 101 and the sub electronic device 200. The VBUS(A4) and VBUS(A9) of the electronic device may be connected with the VBUS(B9) and VBUS(B4), respectively, of the sub electronic device 200. Thus, the sub electronic device 603 may receive power from the electronic device 101. According to various embodiments of the disclosure, the sub electronic device 200 may receive power from an external power source. The CC1(A5) of the type C connector of the electronic device 101 may be connected with the SBU2(B8) of the type C connector of the sub electronic device 200. The SBU1(A8) of the type C connector of the electronic device 101 may be connected with the CC2(B5) of the type C connector 205 of the sub electronic device 200. Thus, a communication channel may be formed between the electronic device 101 and the sub electronic device 200. The D+(A6) of the type C connector of the electronic device 101 may be connected with the D−(B7) of the type C connector 205 of the sub electronic device 200, and the D−(A7) of the type C connector of the electronic device 101 may be connected with the D+ of the type C connector 205 of the sub electronic device 200. Thus, high speed data communication may be possible between the electronic device 101 and the sub electronic device 200.

Figure 3:
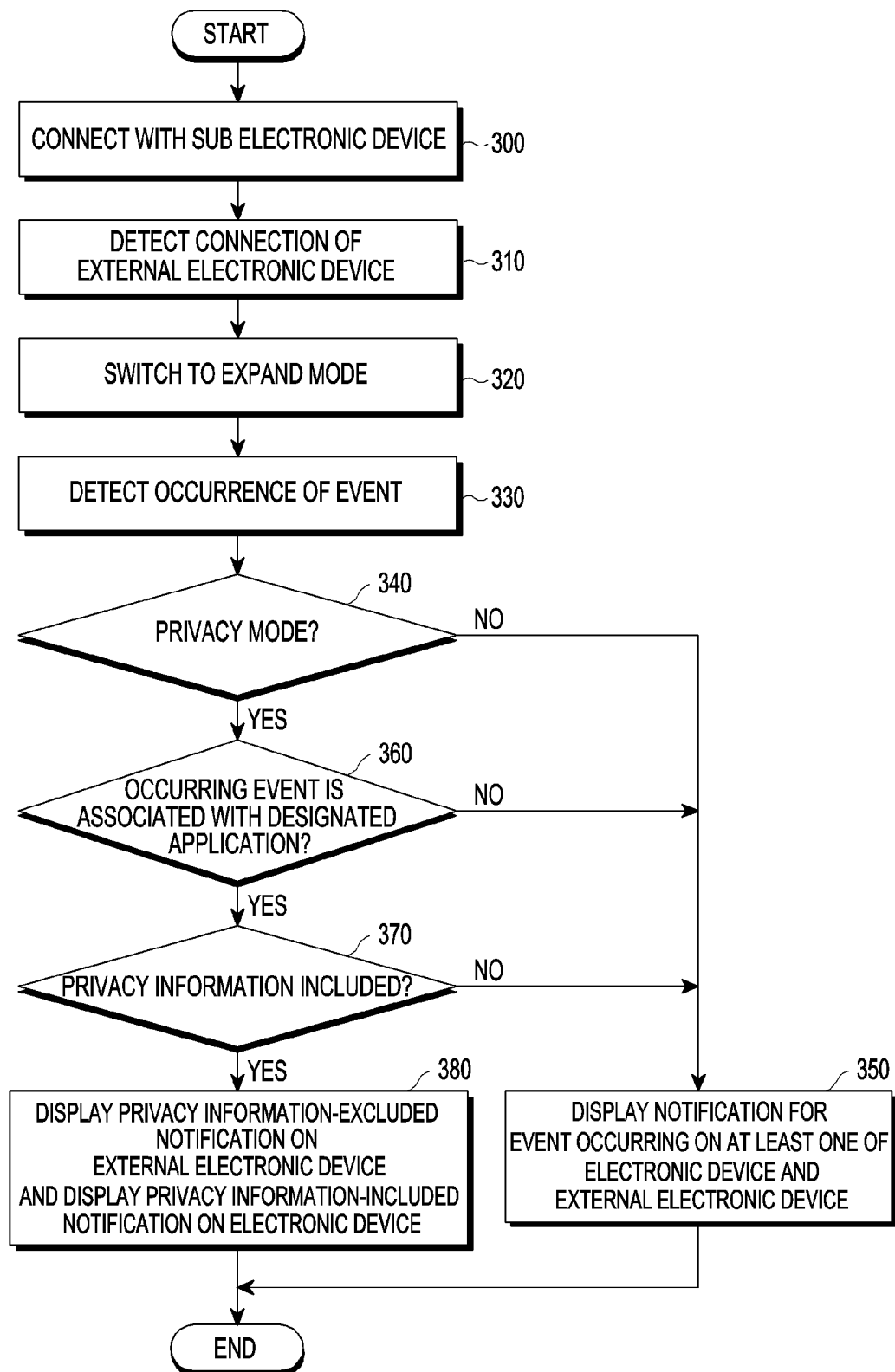
FIG. 3 is a view illustrating an example method of operation by an electronic device according to various embodiments.

FIG. 3 is a view illustrating an example method of operation by an electronic device according to various embodiments.

Referring to FIG. 3, according to various embodiments of the disclosure, an electronic device (e.g., the processor 120 of FIG. 1) may be connected with the sub electronic device 200 via a connector (e.g., the connection terminal 178 of FIG. 1) in operation 300. According to various embodiments of the disclosure, as described above in connection with FIG. 2C, the electronic device (e.g., the electronic device 101 of FIG. 1) may be connected with the sub electronic device (e.g., the sub electronic device 200 of FIG. 2A) via a USB type C connector.

According to various embodiments of the disclosure, the electronic device (e.g., the processor 120 of FIG. 1) may detect connection of an external electronic device (e.g., the external electronic device 201 of FIG. 2A) in operation 310. According to various embodiments of the disclosure, the external electronic device may be connected via a port (e.g., the DP 210 of FIG. 2B) of the sub electronic device. Operation 310 is described in connection with FIGS. 4A to 4D.

According to various embodiments of the disclosure, the electronic device (e.g., the processor 120 of FIG. 1) may switch to an expand mode in operation 320. Operation 320 is described in connection with FIGS. 5A to 5C.

According to various embodiments of the disclosure, the electronic device (e.g., the processor 120 of FIG. 1) may detect an occurrence of an event in operation 330. According to various embodiments of the disclosure, various events may be included, such as call receiving, call sending, message receiving, message sending, or user-designated notification, or other various events that may occur when the electronic device is used.

According to various embodiments of the disclosure, the electronic device (e.g., the processor 120 of FIG. 1) may determine whether the current mode is a privacy mode in operation 340. According to various embodiments of the disclosure, the privacy mode may mean a mode set to display a notification with privacy information excluded, for the occurring event, on a display device (e.g., the display device 201a of FIG. 2A) of an external electronic device.

According to various embodiments of the disclosure, the term "privacy information-excluded notification" may be used interchangeably/alternatively with 'secure notification.' According to various embodiments of the disclosure, the privacy information may be stored in an electronic device (e.g., the memory 130 of FIG. 1) according to a designated application. For example, according to various embodiments of the disclosure, the privacy information may be stored as a mapping table as shown in Table 1.

TABLE 1

| application | privacy information |
| --- | --- |
| phone application | caller's name, caller's contact info, and caller-related image |
| SMS application | SMS sender's name, SMS sender's contact info, SMS content, and SMS sender-related image |
| SNS application | SNS message sender's name (or nickname), SNS message content, and SNS message sender-related image |
| calendar application | schedule stored on specific date |
| reminder application | reminder content |
| messenger application | messenger sender's name, messenger sender's contact info, messenger sender-related image |
| memo application | memo content, etc. |

According to various embodiments of the disclosure, the electronic device (e.g., the memory 130 of FIG. 1) may store only privacy information. In this case, the electronic device 101 (e.g., the processor 120 of FIG. 1) may display the secure notification on the display device 201a of the external electronic device 201 if the occurring event includes privacy information regardless of the kind of the application. According to various embodiments of the disclosure, the electronic device (e.g., the processor 120 of FIG. 1) may display a notification for the event occurring on at least one of the electronic device (e.g., the electronic device 101 of FIG. 1) and the external electronic device 201 in operation 350. According to various embodiments of the disclosure, in the case of not being the privacy mode, the electronic device (e.g., the electronic device 101 of FIG. 1) may display a notification including the privacy information on at least one of the electronic device (e.g., the display device 160 of FIG. 1) and the display device of the external electronic device. According to various embodiments of the disclosure, the privacy mode is described with reference to FIGS. 6A to 6F.

According to various embodiments of the disclosure, the electronic device 101 (e.g., the processor 120 of FIG. 1) may determine whether the occurring event is associated with a designated application in operation 360. According to various embodiments of the disclosure, the designated application may be designated by the user. According to various embodiments of the disclosure, the designated application may be designated by an MDM policy. According to various embodiments of the disclosure, the designated application may be designated by the creator of the application. According to various embodiments of the disclosure, information for the designated application may be stored in an electronic device (e.g., the memory 130 of FIG. 1).

According to various embodiments of the disclosure, the electronic device (e.g., the processor 120 of FIG. 1) may determine whether the occurring event is associated with the designated application based on the mapping table as shown in Table 1. According to various embodiments of the disclosure, in the case of not being the privacy mode (in this case, referred to as normal mode for ease of description), the electronic device (e.g., the processor 120 of FIG. 1) may display a notification including the privacy information on at least one of the electronic device (e.g., the display device 160 of FIG. 1) and the external electronic device (e.g., the display device 201a of FIG. 2A) in operation 350. According to various embodiments of the disclosure, operations in the normal mode are described with reference to FIGS. 7A to 7C.

According to various embodiments of the disclosure, the electronic device (e.g., the processor 120 of FIG. 1) may determine whether the occurring event includes the privacy information in operation 370. For example, to display a notification for call event (e.g., call receiving) on the electronic device (e.g., the display device 160 of FIG. 1), such privacy information as the caller's name or caller's phone number may be needed. Thus, according to various embodiments of the disclosure, the electronic device (e.g., the processor 120 of FIG. 1) may determine that the call event includes the privacy information. According to various embodiments of the disclosure, the electronic device (e.g., the processor 120 of FIG. 1) may determine whether the occurring event includes the privacy information based on the mapping table shown in Table 1. According to various embodiments of the disclosure, if the occurring event does not include the privacy information, the electronic device (e.g., the processor 120 of FIG. 1) may display a notification including the privacy information on at least one of the electronic device (e.g., the display device 160 of FIG. 1) and the external electronic device (e.g., the display device 201a of FIG. 2A) in operation 350. Operation 370 may be appreciated as the operation of determining whether the notification or screen for providing the occurring event-associated information includes the privacy information or whether the occurring event-associated data includes privacy information-associated data.

According to various embodiments of the disclosure, if the occurring event includes the privacy information, the electronic device (e.g., the processor 120 of FIG. 1) may display a privacy information-excluded notification (in other words, a secure notification) on the external electronic device (e.g., the display device 201a of FIG. 2A) and a privacy information-included notification on the electronic device (e.g., the display device 160 of FIG. 1) in operation 380. According to various embodiments of the disclosure, the secure notification is described below in connection with FIGS. 8A to 8E.

According to various embodiments of the disclosure, the method of operating the electronic device (e.g., the electronic device 101) may be performed, with operation 360 omitted. For example, according to various embodiments of the disclosure, if the occurring event includes the privacy information regardless of whether the occurring event is associated with the designated application, the electronic device (e.g., the electronic device 101) may display the secure notification on at least one of the electronic device (e.g., the display device 160 of FIG. 1) and the external electronic device (e.g., the display device 201a of FIG. 2A).

According to various embodiments of the disclosure, the method of operating the electronic device (e.g., the electronic device 101) may be performed, with operation 370 omitted. For example, according to various embodiments of the disclosure, if the occurring event is associated with the designated application, then regardless of whether the occurring event includes the privacy information, the electronic device (e.g., the electronic device 101) may display the secure notification on at least one of the electronic device (e.g., the display device 101 of FIG. 1) and the external electronic device (e.g., the display device 201a of FIG. 2A).

According to various embodiments of the disclosure, the method of operating the electronic device (e.g., the electronic device 101) may be replaced with the operation of displaying the privacy information-excluded notification only on the external electronic device (e.g., the display device 201*a* of FIG. 2A) in operation 380. According to various embodiments of the disclosure, the electronic device (e.g., the processor 120) may perform control to display the privacy information-excluded notification only on the external electronic device (e.g., the display device 201*a* of FIG. 2A) and display a standby screen (e.g., a black screen) on the electronic device (e.g., the display device 160 of FIG. 1).

As used herein, the term "mode," "set to specific mode," or "switch to specific mode" is one mentioned for ease of description of various functions/operations performed according to various embodiments of the disclosure. That is, the term "mode" as used herein means the state itself of a specific function(s) or operation(s) being performed. Thus, the phrase "set to specific mode" may simply mean switching to the state of a function(s) or operation(s) according to the specific mode being able to be performed (in other words, set to the environment) but does not mean that there should be an input (e.g., user input) for "setting to the specific mode" or "switching to the specific mode" nor does it mean that a change should be made to specific hardware and/or software.

FIGS. 4A to 4D are views illustrating example operations of connection of an electronic device with a sub electronic device and an external electronic device according to various embodiments.

Figure 4A:
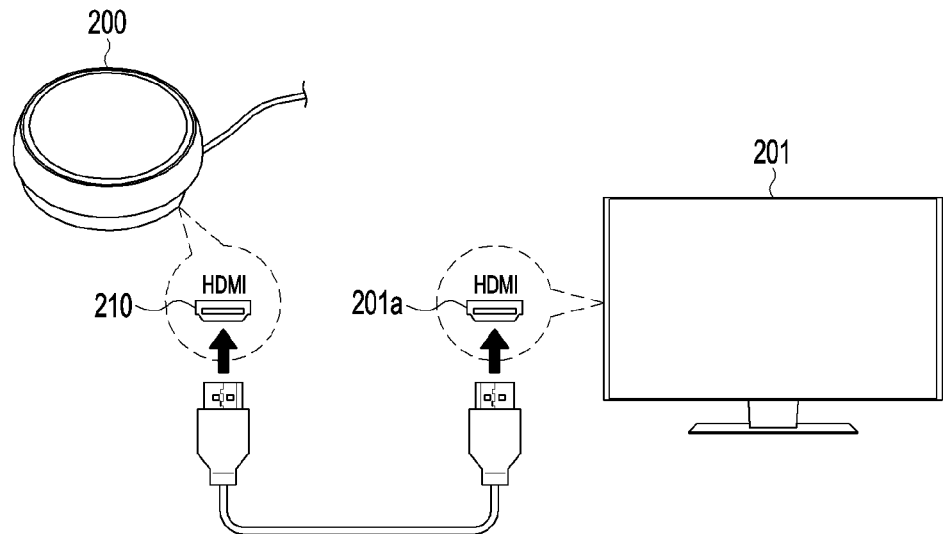
FIGS. 4A to 4D are views illustrating example operations of connection of an electronic device with a sub electronic device and an external electronic device according to various embodiments.

Referring to FIG. 4A, the sub electronic device 200 and the external electronic device 201 may be connected together via the display port 210 of the sub electronic device 200 and the display port (not shown) of the external electronic device 201. Although the HDMI port is shown as an example of the display port 210 in FIG. 2A, various embodiments of the disclosure are not limited thereto.

Figure 4B:
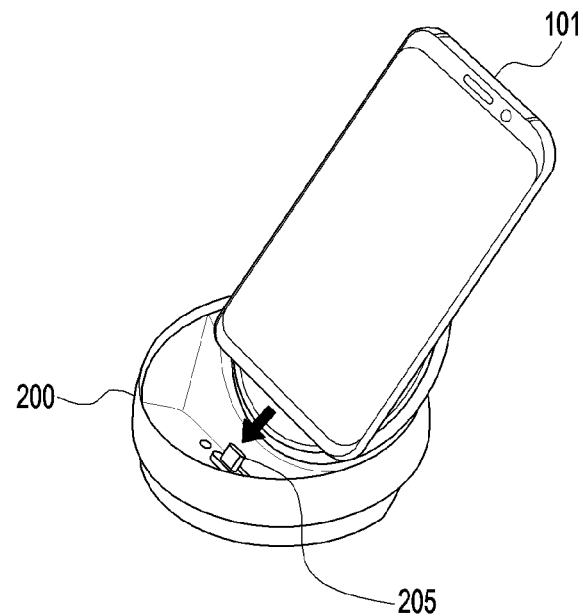

Referring to FIG. 4B, with the sub electronic device 200 and the external electronic device 201 connected together as shown in FIG. 4A, the sub electronic device 200 and the electronic device 101 may be connected together via the connector 205 of the sub electronic device 200 and the connector (not shown) of the electronic device 101. According to various embodiments of the disclosure, the connector of the electronic device 101 and the connector 205 of the sub electronic device 200 may include a USB type C but embodiments of the disclosure are not limited thereto. As shown in FIG. 4B, if the electronic device 101 is connected with the sub electronic device 200, the electronic device 101 (e.g., the processor 120 of FIG. 1) may detect the connection of the external electronic device 201. According to various embodiments of the disclosure, the order of FIGS. 4A and 4B may be changed.

Figure 4C:
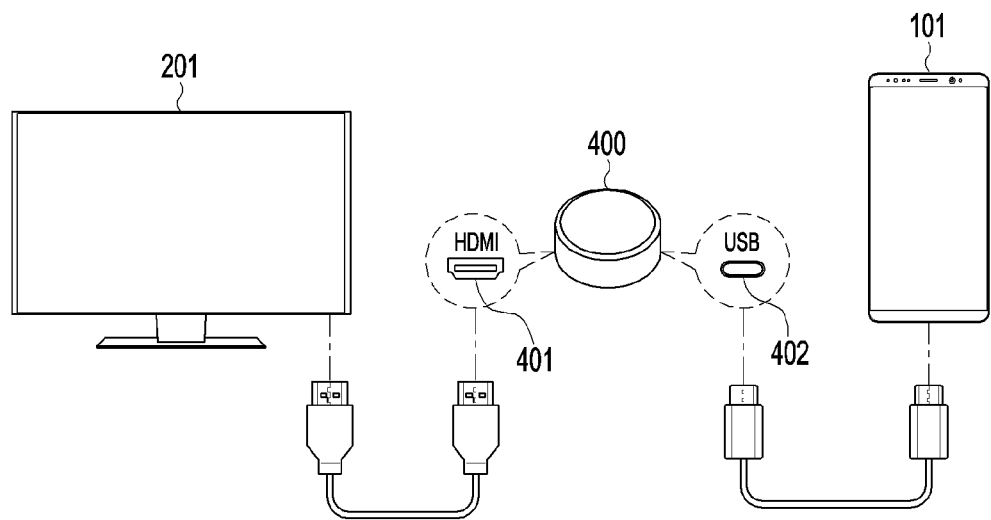

FIG. 4C illustrates another example of the sub electronic device 200 according to various embodiments of the disclosure, wherein the sub electronic device 200 is a dongle 400. According to various embodiments of the disclosure, the electronic device 101 may detect connection of the external electronic device 201, while in connection with the dongle 400. According to various embodiments of the disclosure, the external electronic device 201 may be connected to the HDMI port 401 of the dongle 400. According to various embodiments of the disclosure, the electronic device 101 may be connected to the USB port 402 of the dongle 400. According to various embodiments of the disclosure, the electronic device 101 may detect the external electronic device 201 connected via the dongle 400.

Figure 4D:
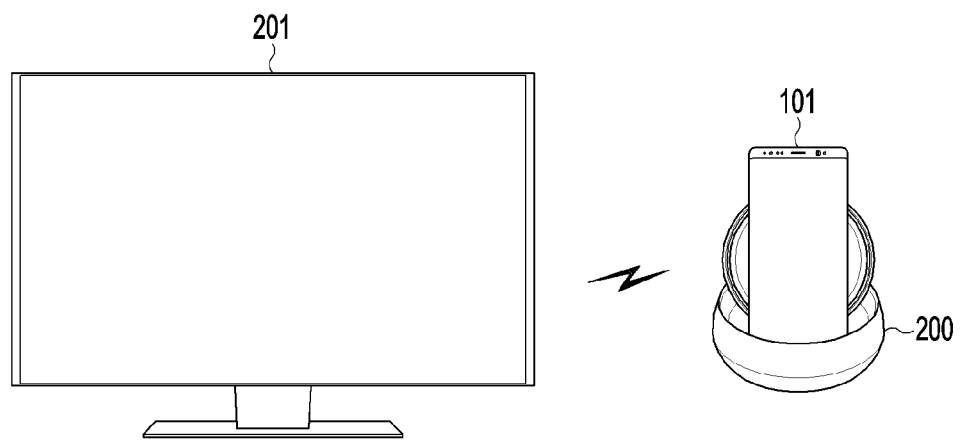

FIG. 4D illustrates an example in which the electronic device 101 is connected with the external electronic device 201 via wireless communication according to various embodiments of the disclosure. According to various embodiments of the disclosure, the electronic device 201 may be connected with the external electronic device 201 via a communication module (e.g., the communication module 190 of FIG. 1) while in connection with the sub electronic device 200. According to various embodiments of the disclosure, the electronic device 101 may be connected with the external electronic device 201 via the communication module of the sub electronic device 200 while in connection with the sub electronic device 200. In this case, the sub electronic device 200 may transmit information indicating that connection with the external electronic device 201 has been made and information for connecting with the external electronic device 201 to the electronic device 101. The electronic device 101 may detect the connection of the external electronic device 201 according to various embodiments of the disclosure described above in connection with FIG. 4D.

Figure 5A:
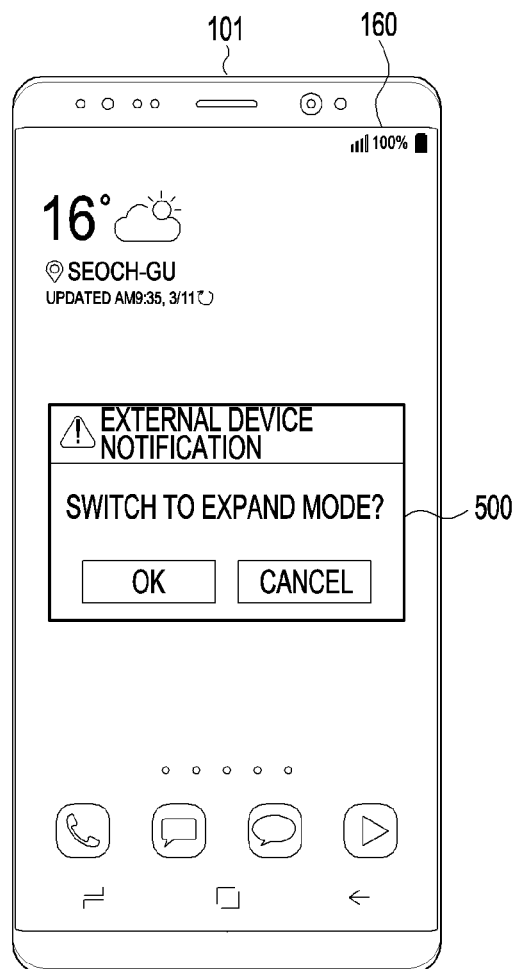
FIGS. 5A to 5C are views illustrating an expand mode according to connection of an external electronic device according to various embodiments.
Figure 5B:
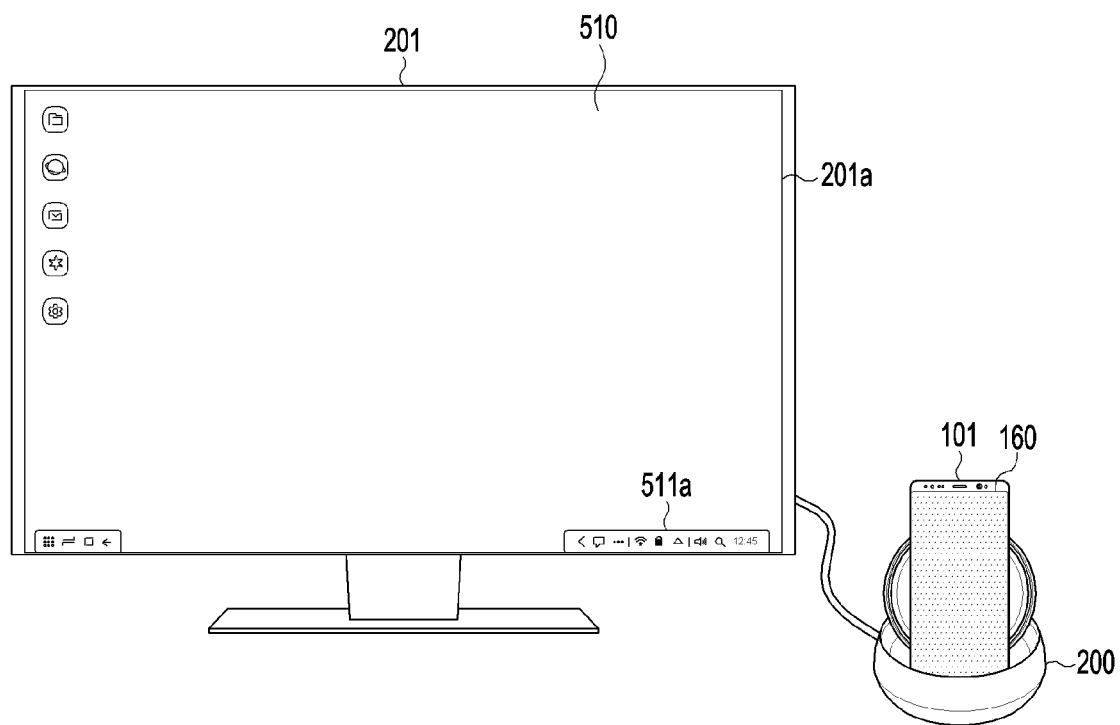
Figure 5C:
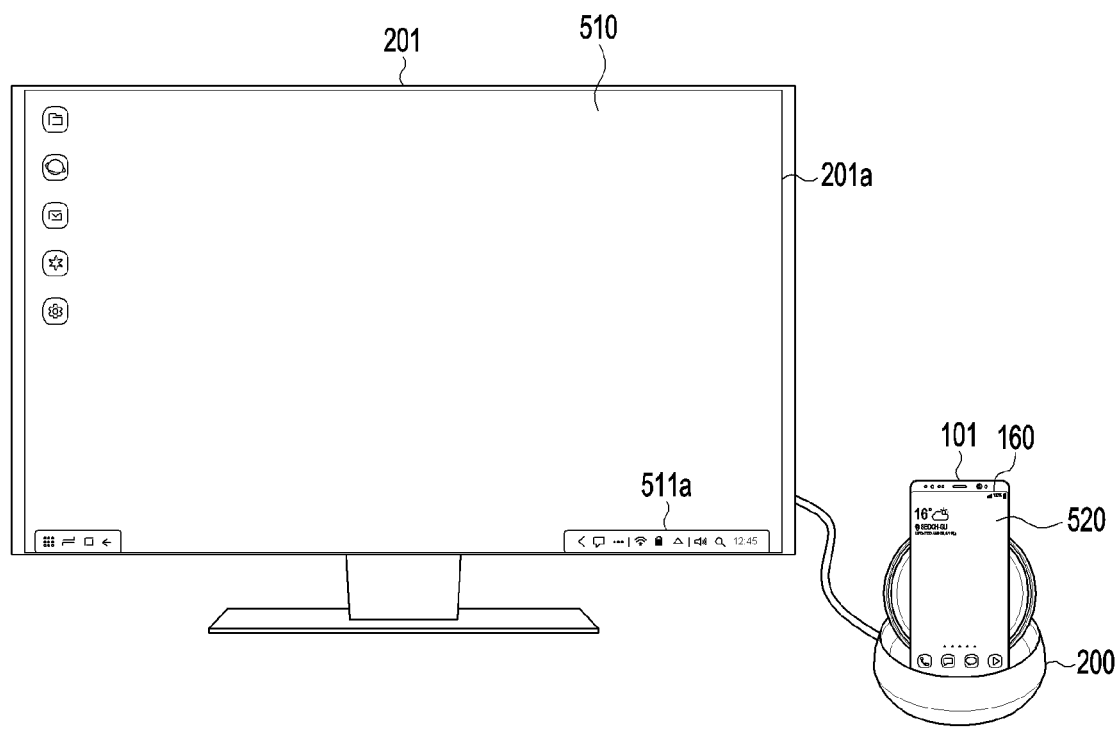

FIGS. 5A to 5C are views illustrating an expand mode according to connection of an external electronic device (e.g., the external electronic device 201 of FIG. 2A) according to various embodiments.

According to various embodiments of the disclosure, upon detecting connection of the external electronic device (e.g., the external electronic device 201 of FIG. 2A) while in connection with the sub electronic device (e.g., the sub electronic device 200 of FIG. 2A), the electronic device 101 may enter into the expand mode (in other words, switching from the normal mode to expand mode). According to various embodiments of the disclosure, the expand mode may mean a mode of displaying a screen on the external electronic device (e.g., the display device 201*a* of the external electronic device 201 of FIG. 2A) or the electronic device 101 and the external electronic device (e.g., the display device 201*a* of the external electronic device 201 of FIG. 2A) (in other words, the state of the screen being displayed). According to various embodiments of the disclosure, the screens displayed on the display device 160 (e.g., the touchscreen display) and the external electronic device (e.g., the display device 201*a* of the external electronic device 201 of FIG. 2A) may be different in display attribute. According to various embodiments of the disclosure, the display attribute may include at least one of resolution, number of screens, direction of screen, position of displayed object on screen, brightness of screen, color of object, shape of object, contrast, or screen size. For example, the screen on the display device 160 of the electronic device 101 may be displayed in a relatively lower resolution (e.g., 1920×1080) than the external electronic device (e.g., the display device 201*a* of the external electronic device 201 of FIG. 2A), and the screen on the external electronic device (e.g., the display device 201*a* of the external electronic device 201 of FIG. 2A) may be displayed in a relatively higher resolution (e.g., 3840×2160) than the display device 160 of the electronic device 101. According to various embodiments of the disclosure, information about the external electronic device (e.g., the external electronic device 201 of FIG. 2A) connectable with the electronic device 101 or the sub electronic device 201 may be stored in the memory (e.g., the memory 130 of FIG. 1) of the electronic device 101. According to various embodiments of the disclosure, the electronic device 101 may display a screen different in at least one display attribute from the screen displayed on the display device 160 of the electronic device 101 on the external electronic device (e.g., the display device 201*a* of the external electronic device 201 of FIG. 2A) based on the information about the external electronic device (e.g., the external electronic device 201 of FIG. 2A) stored in the memory 130. According to various embodiments of the disclosure, upon detecting connection of the electronic device 101 with the external electronic device (e.g., the external electronic device 201 of FIG. 2A) via the sub electronic device (e.g., the sub electronic device 200 of FIG. 2A), the electronic device 101 may obtain display attribute information about the external electronic device (e.g., the external electronic device 201 of FIG. 2A) from a server (not shown) of the manufacturer of the external electronic device (e.g., the external electronic device 201 of FIG. 2A) via the communication module (e.g., the communication module 190 of FIG. 1). According to various embodiments of the disclosure, the electronic device 101 may display a screen different in at least one display attribute from the screen displayed on the display device 160 of the electronic device 101 on the external electronic device (e.g., the display device 201*a* of FIG. 2A) based on the display attribute information received from the server of the manufacturer of the external electronic device (e.g., the external electronic device 201 of FIG. 2A). According to various embodiments of the disclosure, the memory (e.g., the memory 130 of FIG. 1) of the electronic device 101 may store information about various interfaces defined according to the display attributes. The electronic device 101 may display a screen adapted for the external electronic device (e.g., the display device 201*a* of the external electronic device 201 of FIG. 2A) on the external electronic device (e.g., the display device 201*a* of the external electronic device 201 of FIG. 2A) based on the obtained display attribute information and the information about various interfaces stored in the memory (e.g., the memory 130 of FIG. 1). According to various embodiments of the disclosure, the normal mode may mean a mode in which screen is displayed only on the display device 160 of the electronic device 101. For example, according to various embodiments of the disclosure, the normal mode may mean that as the external electronic device (e.g., the external electronic device 201 of FIG. 2A) is not connected with the electronic device 101, screen is displayed only on the display device 160 of the electronic device 101. According to various embodiments of the disclosure, the electronic device 101 may transmit various screens and/or data for displaying various interfaces on the external electronic device (e.g., the display device 201*a* of the external electronic device 201 of FIG. 2A) to the external electronic device (e.g., the external electronic device 201 of FIG. 2A).

Referring to FIG. 5A, according to various embodiments of the disclosure, upon detecting connection of the external electronic device (e.g., the external electronic device 201 of FIG. 2A), the electronic device 101 may display a confirm message 500 for receiving a switch to the expand mode on the display device 160. According to various embodiments of the disclosure, by the user's input for the confirm message 500, a switch may be made to the expand mode. According to various embodiments of the disclosure, the electronic device 101 may switch to the expand mode upon detecting connection of the external electronic device (e.g., the external electronic device 201 of FIG. 2A) regardless of whether there is a user input.

Referring to FIG. 5B, according to various embodiments of the disclosure, in the expand mode, the electronic device 101 may display a first screen 510 on the external electronic device 201. According to various embodiments of the disclosure, the electronic device 101 may be in the state of being connected with the sub electronic device 200. According to various embodiments of the disclosure, in the expand mode, the electronic device 101 may perform control to display a standby screen (e.g., a black screen) on the display device 160 of the electronic device 101. According to various embodiments of the disclosure, the phrase "standby screen is displayed" may be appreciated as switching to the standby screen. According to various embodiments of the disclosure, the phrase "standby screen is displayed" may also be appreciated as the display device 160 of the electronic device 101 turning off. According to various embodiments of the disclosure, the standby screen may include a screen state in which the screen of the display device 160 darkens and is thus shown like the standby screen, a state in which a black screen is overlaid on the higher layer of the screen displayed on the display device 160 so that the standby screen is shown, and a state in which the screen of the display device 160 turns off, or other various screens (or screen display states). According to various embodiments of the disclosure, a bar 511*a* may be displayed on the first screen 510.

Referring to FIG. 5C, according to various embodiments of the disclosure, in the expand mode, the electronic device 101 may display a first screen 510 on the display device 201*a* of the external electronic device 201. According to various embodiments of the disclosure, the electronic device 101 may be in the state of being connected with the sub electronic device 200. According to various embodiments of the disclosure, in the expand mode, the electronic device 101 may display a second screen 520 (e.g., a home screen) on the display device 160. According to various embodiments of the disclosure, the bar 511*a* for displaying the state information about the electronic device 101 or the external electronic device 201 may be displayed at the bottom of the first screen 510 in the form of a user interface (or graphical user interface (GUI)).

FIGS. 6A to 6F are views illustrating an example of operation of entry into a privacy mode according to various embodiments.

Figure 6A:
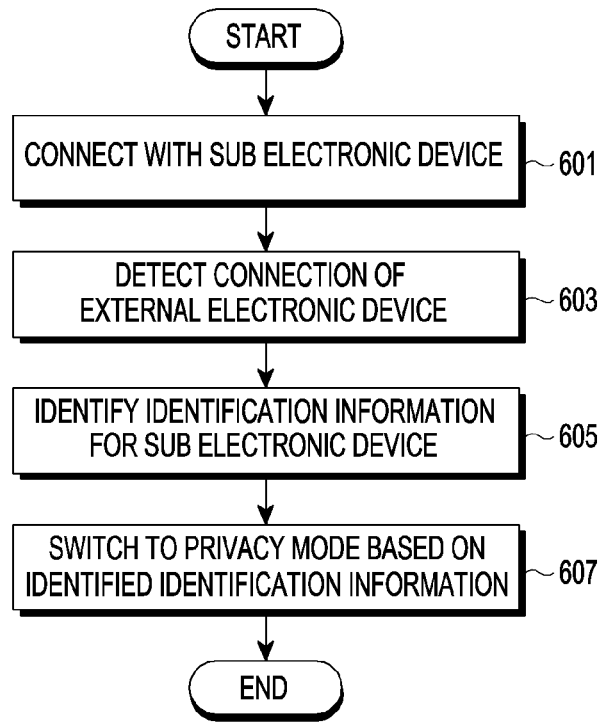
FIGS. 6A to 6F are views illustrating an example of operation of entry into a privacy mode according to various embodiments.

Referring to FIG. 6A, according to various embodiments of the disclosure, the electronic device (e.g., the processor 120 of FIG. 1) may detect connection of a sub electronic device (e.g., the sub electronic device 200 of FIG. 2A) in operation 601.

According to various embodiments of the disclosure, the electronic device (e.g., the processor 120 of FIG. 1) may detect connection of an external electronic device (e.g., the external electronic device 201 of FIG. 2) in operation 603. According to various embodiments of the disclosure, entry into the expand mode may be performed in operation 603.

According to various embodiments of the disclosure, the electronic device (e.g., the processor 120 of FIG. 1) may identify identification information about the sub electronic device (e.g., the sub electronic device 200 of FIG. 2A) in operation 605. According to various embodiments of the disclosure, the identification information may be stored in the memory (e.g., the memory 230 of FIG. 2B) of the sub electronic device (e.g., the sub electronic device 200 of FIG. 2A). If connected with the sub electronic device (e.g., the sub electronic device 200 of FIG. 2A), the electronic device (e.g., the processor 120 of FIG. 1) may obtain identification information about the sub electronic device (e.g., the sub electronic device 200 of FIG. 2A) from the sub electronic device (e.g., the sub electronic device 200 of FIG. 2A).

According to various embodiments of the disclosure, the electronic device (e.g., the processor 120 of FIG. 1) may switch to the privacy mode based on the identified identification information in operation 607. According to various embodiments of the disclosure, the memory (e.g., the memory 130 of FIG. 1) of the electronic device (e.g., the electronic device 101 of FIG. 1) may store a mapping table that stores the identification information about the sub electronic device (e.g., the sub electronic device 200 of FIG. 2A) and information regarding whether to switch to the privacy mode according to the identification information. According to various embodiments of the disclosure, upon identifying the identification information about the sub electronic device (e.g., the sub electronic device 200 of FIG. 2A), the electronic device (e.g., the processor 120 of FIG. 1) may switch the operation mode to the privacy mode of the electronic device (e.g., the electronic device 101 of FIG. 1) based on the mapping table storing the information regarding whether to switch to the privacy mode. According to various embodiments of the disclosure, the electronic device (e.g., the processor 120 of FIG. 1) may determine whether the sub electronic device (e.g., the sub electronic device 200 of FIG. 2A) is a business-to-business (B2B) device or business-to-consumer (B2C) device based on the identification information about the sub electronic device (e.g., the sub electronic device 200 of FIG. 2A). According to various embodiments of the disclosure, if the sub electronic device (e.g., the sub electronic device 200 of FIG. 2A) is a B2B device, the electronic device (e.g., the processor 120 of FIG. 1) may set the operation mode of the electronic device (e.g., the electronic device 101 of FIG. 1) to the privacy mode. According to various embodiments of the disclosure, if the sub electronic device (e.g., the sub electronic device 200 of FIG. 2A) is a B2C device, the electronic device (e.g., the processor 120 of FIG. 1) may set the operation mode of the electronic device (e.g., the electronic device 101 of FIG. 1) to the normal mode.

Figure 6B:
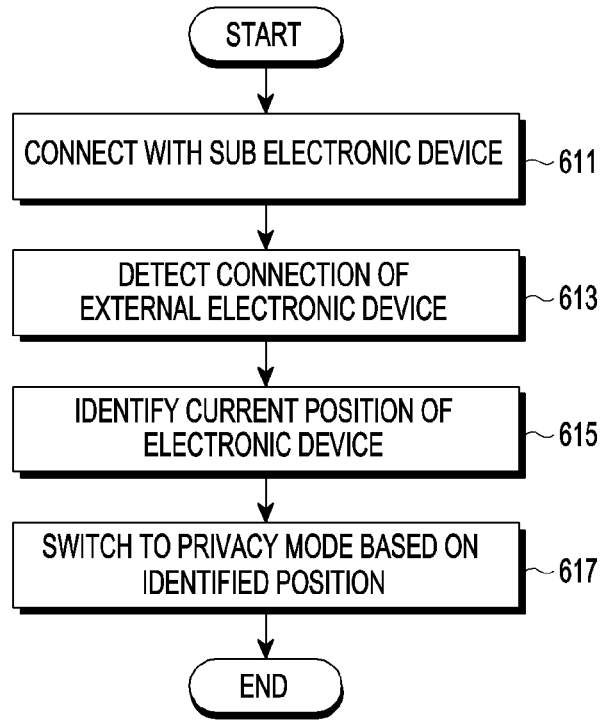

Referring to FIG. 6B, according to various embodiments of the disclosure, the electronic device (e.g., the processor 120 of FIG. 1) may be connected with the sub electronic device (e.g., the sub electronic device 200 of FIG. 2A) in operation 611.

According to various embodiments of the disclosure, the electronic device (e.g., the processor 120 of FIG. 1) may detect connection of an external electronic device (e.g., the external electronic device 201 of FIG. 2A) in operation 613. According to various embodiments of the disclosure, the electronic device (e.g., the processor 101 of FIG. 1) may enter into the expand mode in operation 613.

According to various embodiments of the disclosure, the electronic device (e.g., the processor 120 of FIG. 1) may identify the current position of the electronic device (e.g., the electronic device 101 of FIG. 1) using a sensor module (e.g., the sensor module 176 of FIG. 1) or a communication module (e.g., the communication module 190 of FIG. 1) in operation 615. According to various embodiments of the disclosure, the electronic device (e.g., the electronic device 101 of FIG. 1) may determine the current position of the electronic device (e.g., the electronic device 101 of FIG. 1) using a Wi-Fi positioning system (WPS) or GNSS scheme.

According to various embodiments of the disclosure, the electronic device (e.g., the processor 120 of FIG. 1) may switch to the privacy mode based on the identified position information in operation 617. According to various embodiments of the disclosure, upon identifying that the current position of the electronic device (e.g., the electronic device 101 of FIG. 1) is a designated position (e.g., in a company), the operation mode of the electronic device (e.g., the electronic device 101 of FIG. 1) may switch to the privacy mode. According to various embodiments of the disclosure, if the current position of the electronic device (e.g., the electronic device 101 of FIG. 1) is a different position (e.g., home) from the designated position, company, it may be operated in the normal mode even when connection of the external electronic device (e.g., the external electronic device 201 of FIG. 2A) is detected. According to various embodiments of the disclosure, the designated position may be preset by the manufacturer of the electronic device (e.g., the electronic device 101 of FIG. 1) or may be set by the user.

Figure 6C:
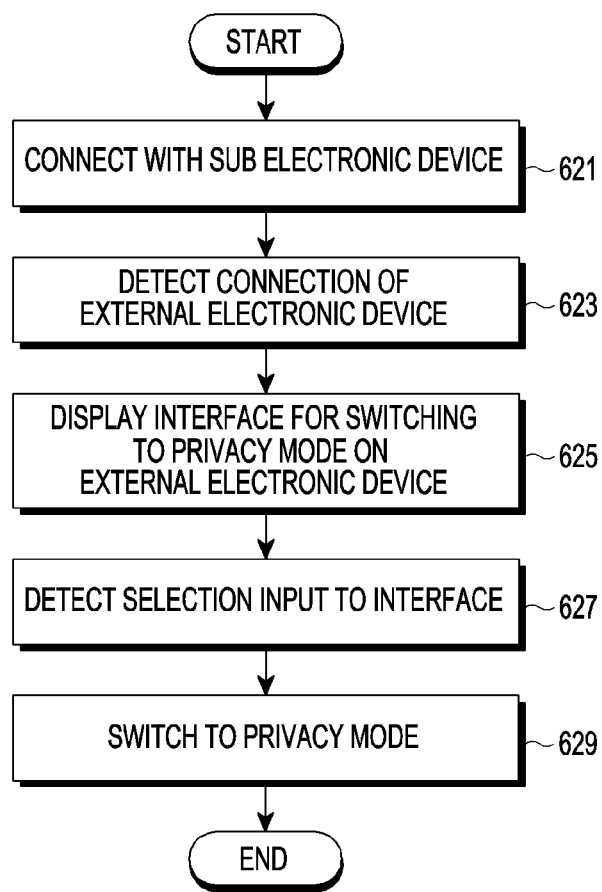

Referring to FIG. 6C, according to various embodiments of the disclosure, the electronic device (e.g., the processor 120 of FIG. 1) may detect connection with a sub electronic device (e.g., the sub electronic device 200 of FIG. 2A) in operation 621.

According to various embodiments of the disclosure, the electronic device 101 (e.g., the processor 120 of FIG. 1) may detect connection of an external electronic device (e.g., the external electronic device 201 of FIG. 2A) in operation 623. According to various embodiments of the disclosure, the electronic device (e.g., the processor 101 of FIG. 1) may enter into the expand mode in operation 613.

According to various embodiments of the disclosure, the electronic device 101 (e.g., the processor 120 of FIG. 1) may display a user interface for switching to the privacy mode on the external electronic device (e.g., the external electronic device 201) using the display device (e.g., the display device 160 of FIG. 1) in operation 625. According to various embodiments of the disclosure, the user interface for switching to the privacy mode may include a visual user interface such as an icon or the confirm message. According to various embodiments of the disclosure, the user interface for switching to the privacy mode may include various types of user interfaces such as audible or tactile interfaces. In this case, operation 625 may be replaced with the operation of outputting the user interface for switching to the privacy mode.

According to various embodiments of the disclosure, the electronic device 101 (e.g., the processor 120 of FIG. 1) may detect a selection input for the user interface for switching to the privacy mode in operation 627.

According to various embodiments of the disclosure, the electronic device 101 (e.g., the processor 120 of FIG. 1) may switch the operation mode of the electronic device (e.g., the electronic device 101) to the privacy mode according to the selection input in operation 629.

Figure 6D:
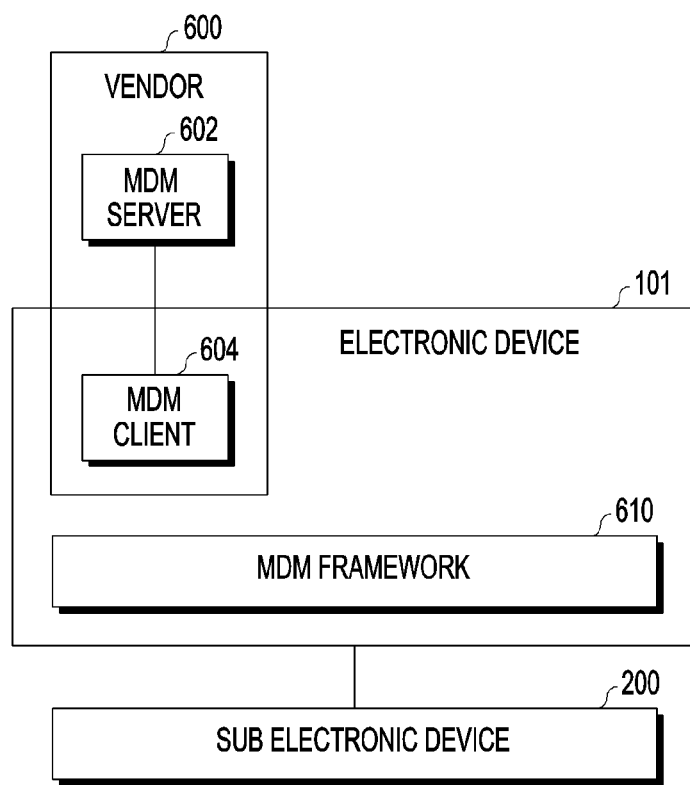

Referring to FIG. 6D, according to various embodiments of the disclosure, an electronic device 101 may be connected with a sub electronic device 200. According to various embodiments of the disclosure, the identification information about the sub electronic device 200 may be provided from the vendor 600 of the sub electronic device 200. According to various embodiments of the disclosure, the identification information about the sub electronic device 200 may be provided via a mobile device management (MDM) policy. According to various embodiments of the disclosure, the MDM may be received from the MDM server 602 of the vendor 600 through the MDM client 604 of the electronic device 101. According to various embodiments of the disclosure, the electronic device 101 may store the identification information about the sub electronic device 200 obtained from the vendor 600 in the MDM framework 610. According to various embodiments of the disclosure, the identification information about the sub electronic device 200 provided from the vendor 600 may be stored in the memory (e.g., the memory 230 of FIG. 2B) of the sub electronic device 200. According to various embodiments of the disclosure, if the external electronic device (e.g., the external electronic device 201 of FIG. 2A) is connected with the electronic device 101 via the sub electronic device 200, the electronic device 101 may be controlled to be operated in the privacy mode according to the MDM policy provided from the vendor 600. According to various embodiments of the disclosure, the MDM policy may include a policy to control the electronic device 101 so that the standby screen is displayed on the external electronic device (e.g., the display device 201a of the external electronic device 201 of FIG. 2A) and a screen associated with the designated application is displayed only on the display device (e.g., the display device 160 of FIG. 2A) of the electronic device 101 in the privacy mode according to various embodiments of the disclosure, for the application (e.g., an application for accessing the company's server) designated by the manager.

Figure 6E:
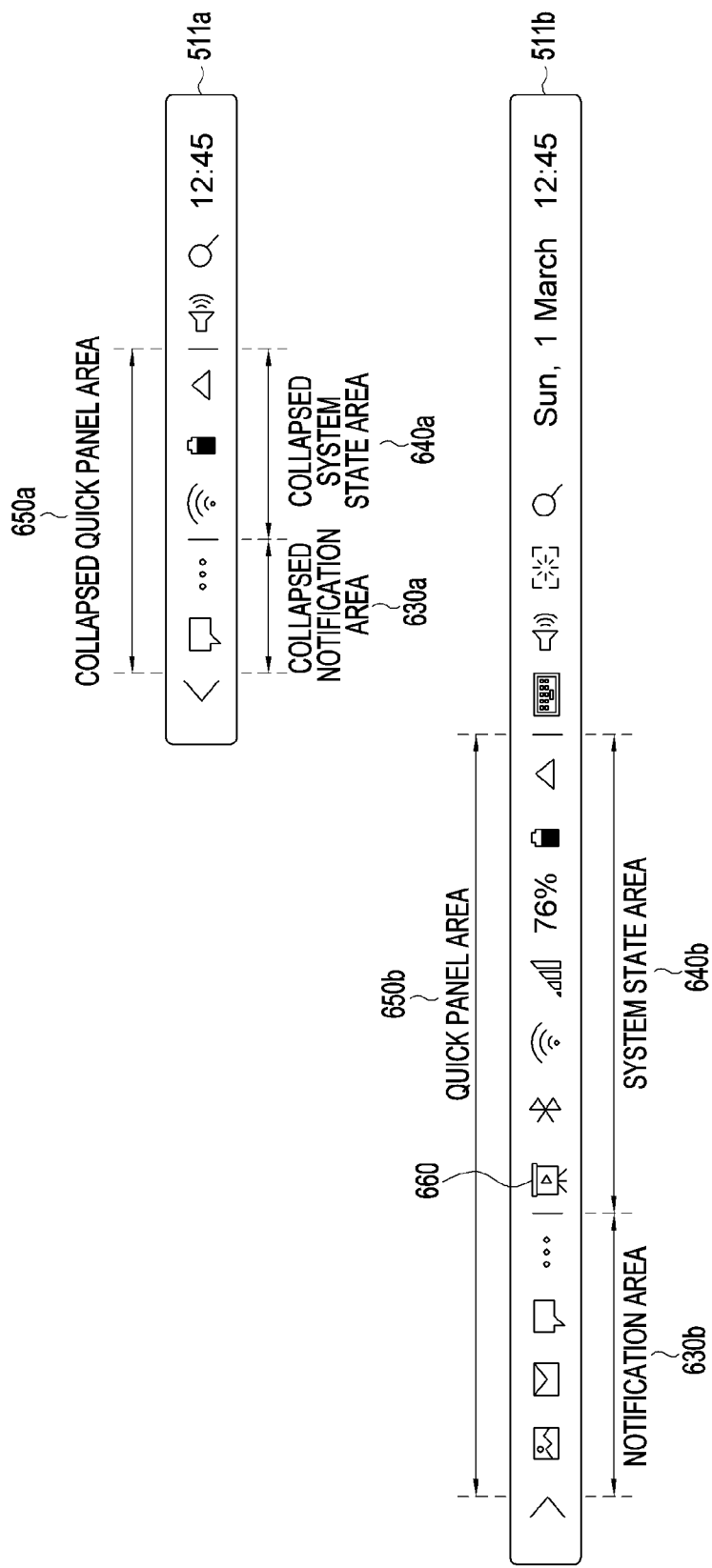

Referring to FIG. 6E, according to various embodiments of the disclosure, the bars 511a and 511b displayed on the external electronic device (e.g., the display device 201a of the external electronic device 201 of FIG. 2A) may have various shapes. According to various embodiments of the disclosure, the bars 511a and 511b may include a first type bar 511a in a collapsed state and a second type bar 511b in an uncollapsed (in other words, expanded) state. According to various embodiments of the disclosure, the first type bar 511a may include a collapsed notification area 630a, a collapsed system state area 610a, and a collapsed quick panel area 650a. According to various embodiments of the disclosure, user interfaces regarding notification information associated with various applications may be displayed in the collapsed notification area 630a and the notification area 630b. According to various embodiments of the disclosure, in the collapsed system state area 640a and system state area 640b, various user interfaces indicating the system state of the electronic device 101, e.g., battery status (in other words, remaining battery) or Wi-Fi signal sensitivity, may be displayed. According to various embodiments of the disclosure, in the system state area 640b, a graphical user interface (GUI) 660 for switching to the privacy mode may be displayed. According to various embodiments of the disclosure, by a user input (e.g., selection by the mouse point) for the graphical user interface 660, the electronic device 101 may switch the operation mode of the electronic device 101 to the privacy mode. According to various embodiments of the disclosure, the graphical user interface 660 may be displayed in at least one of the notification area 630b, collapsed notification area 630a, and collapsed system state area 640a as well as in the system state area 640b.

Figure 6F:
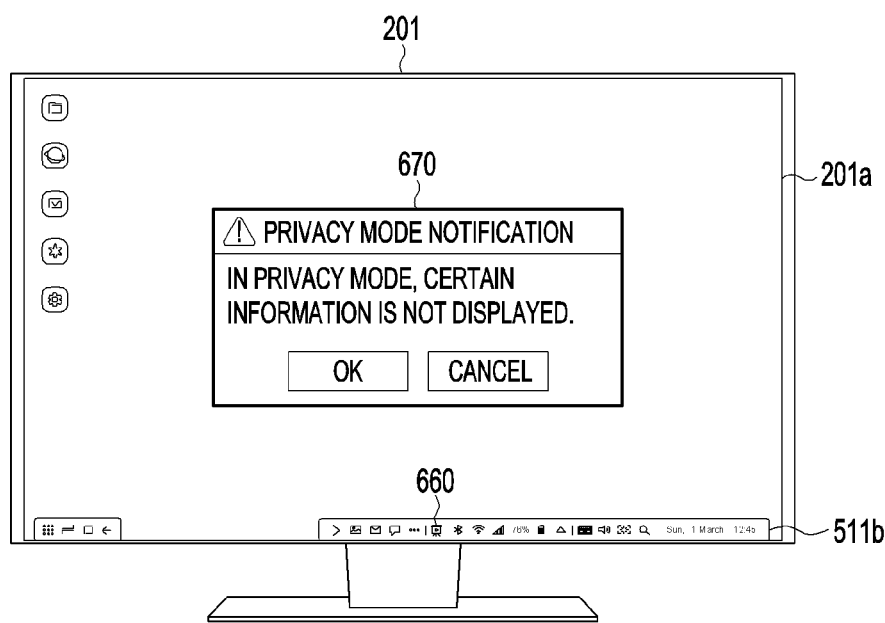

Referring to FIG. 6F, according to various embodiments of the disclosure, the electronic device 101 may display a notification message 670, which indicates that specific information (e.g., privacy information) is not displayed in the privacy mode, on the display device 201a of the external electronic device 201, upon switching to the privacy mode (e.g., upon input of selection for the graphical user interface 660a displayed on the second type bar 511b).

Figure 7A:
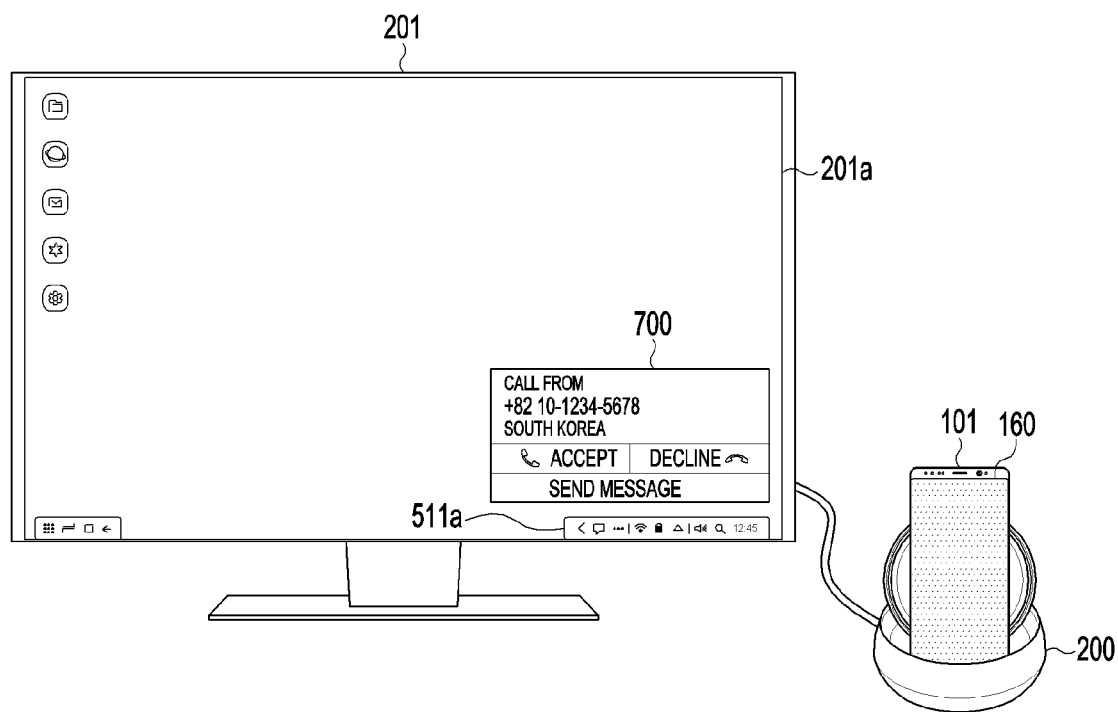
FIGS. 7A to 7C are views illustrating an example operation in a normal mode when an event occurs according to various embodiments.
Figure 7B:
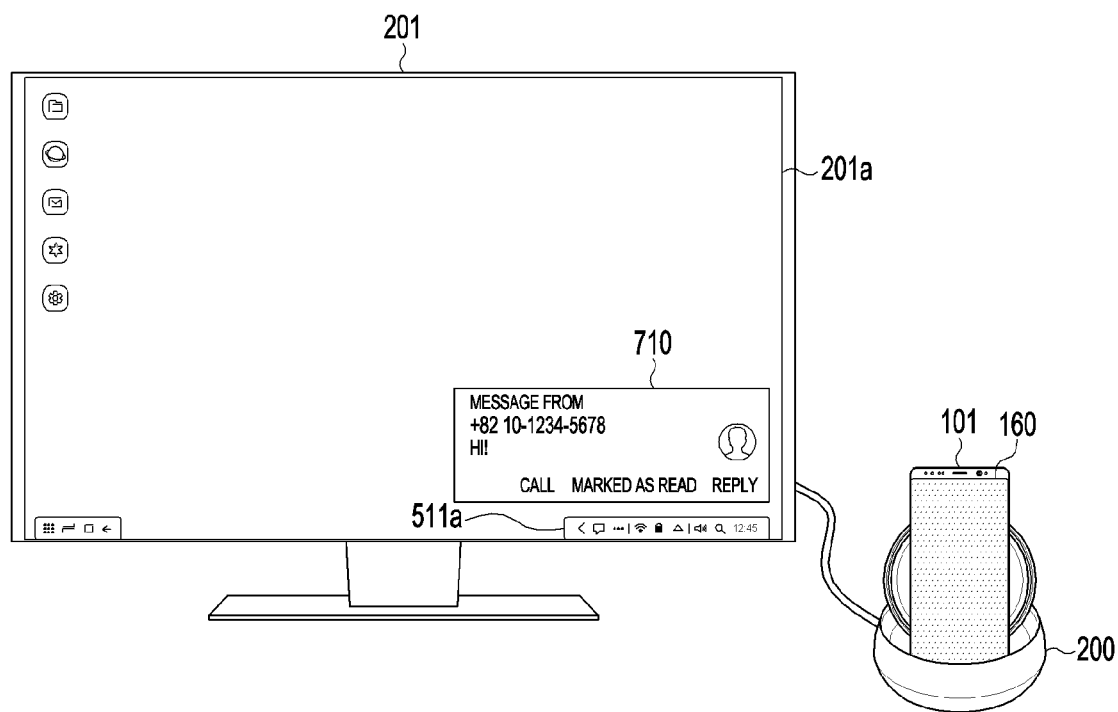
Figure 7C:
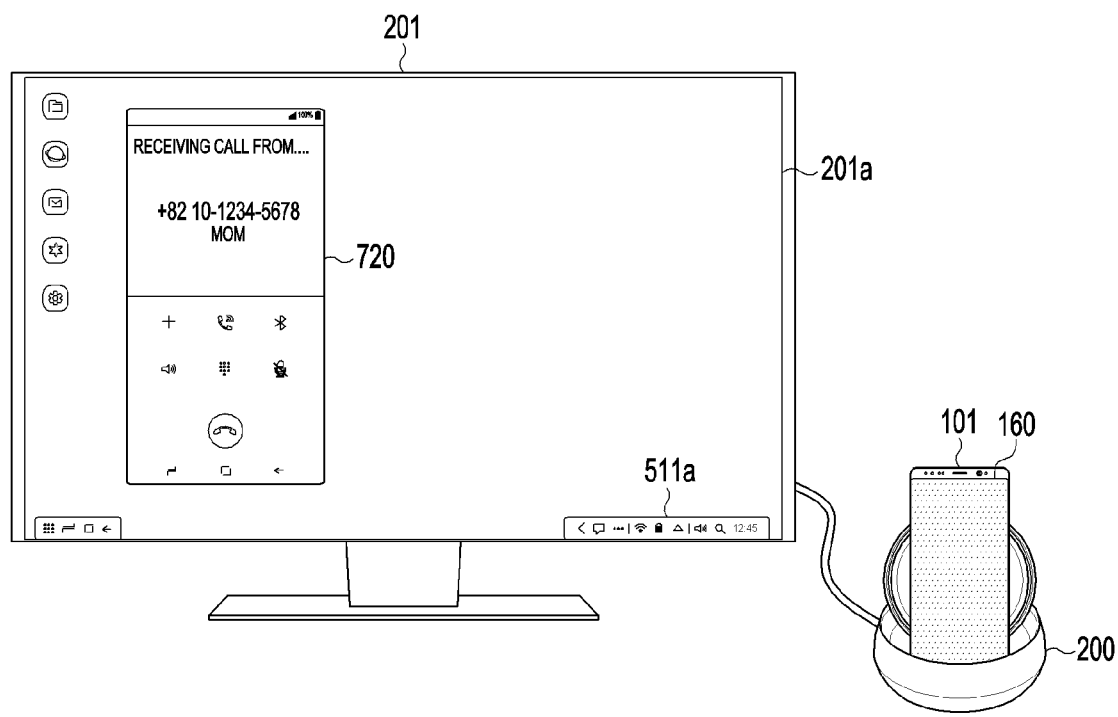

FIGS. 7A to 7C are views illustrating an example operation in a normal mode when an event occurs according to various embodiments.

Referring to FIG. 7A, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may display the first type bar 511a on the display device 201a of the external electronic device 201. According to various embodiments of the disclosure, the electronic device 101 may detect an occurrence of an event (e.g., call receiving) associated with an application (e.g., phone application) stored in the memory (e.g., the memory 130 of FIG. 1) of the electronic device 101. According to various embodiments of the disclosure, the electronic device 101 may display a notification 700 associated with the occurring event on the display device 201a of the external electronic device 201. According to various embodiments of the disclosure, the notification 700 may include privacy information (e.g., the caller's phone number). According to various embodiments of the disclosure, the electronic device 101 may display a standby screen (e.g., a black screen) on the display device 160 as shown in FIG. 7A.

Referring to FIG. 7B, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may display the first type bar 511a on the display device 201a of the external electronic device 201. According to various embodiments of the disclosure, the electronic device 101 may detect an occurrence of an event (e.g., receiving an SMS message) associated with an application (e.g., SMS application) stored in the memory (e.g., the memory 130 of FIG. 1) of the electronic device 101. According to various embodiments of the disclosure, the electronic device 101 may display a notification 710 associated with the occurring event on the display device 201a of the external electronic device 201. According to various embodiments of the disclosure, the notification 700 may include privacy information (e.g., the SMS sender's phone number or SMS content). According to various embodiments of the disclosure, the electronic device 101 may display a standby screen (e.g., a black screen) on the display device 160 as shown in FIG. 7B.

Referring to FIG. 7C, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may display the first type bar 511a on the display device 201a of the external electronic device 201. According to various embodiments of the disclosure, the electronic device 101 may detect an occurrence of an event (e.g., receiving an SMS message) associated with an application (e.g., phone application) stored in the memory (e.g., the memory 130 of FIG. 1) of the electronic device 101. According to various embodiments of the disclosure, the electronic device 101 may display a notification 720 associated with the occurring event on the external electronic device 201. According to various embodiments of the disclosure, the notification 720 associated with the occurring event may include a mirroring screen for the screen displayed (or to be displayed) on the display device 160 of the electronic device 101. According to various embodiments of the disclosure, the notification 700 may include privacy information (e.g., the caller's phone number). According to various embodiments of the disclosure, the electronic device 101 may display the standby screen (e.g., a black screen) or the same screen as the mirroring screen. FIG. 7C illustrates an example in which the standby screen is displayed on the display device 160.

FIGS. 8A to 8E are views illustrating an example operation in a privacy mode when an event occurs according to various embodiments.

Figure 8A:
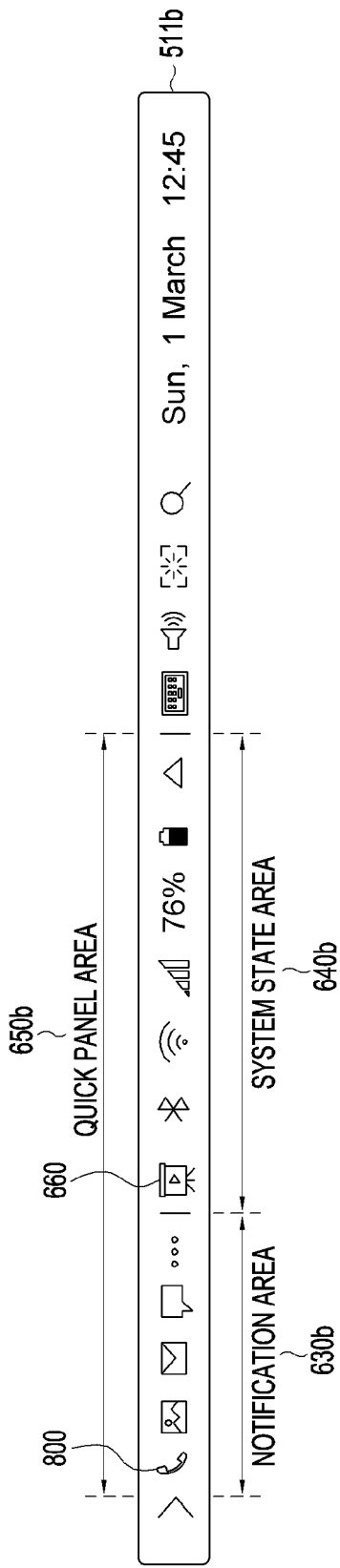
FIGS. 8A to 8F are views illustrating an example operation in a privacy mode when an event occurs according to various embodiments.

Referring to FIG. 8A, according to various embodiments of the disclosure, the electronic device (e.g., the electronic device 101 of FIG. 1) may detect an occurrence of an event (e.g., call receiving) in the privacy mode. According to various embodiments of the disclosure, the electronic device (e.g., the electronic device 101 of FIG. 1) may display (in other words, include) an icon 800 associated with the occurring event (in other words, an icon for providing a secure notification) on a bar (e.g., the second type bar 511b), according to various embodiments of the disclosure, so as to provide the secure notification in the privacy mode. FIG. 8A illustrates an example in which a phone icon not including the privacy information is displayed as an example of the secure notification. According to various embodiments of the disclosure, the icon 800 may be displayed in the quick panel area 650b, i.e., the notification area 630b or system state area 640b. According to various embodiments of the disclosure, in the system state area 640b, a graphical user interface 660 for switching to the privacy mode may be displayed. According to various embodiments of the disclosure, if the icon 800 associated with the event occurring on the electronic device (e.g., the electronic device 101 of FIG. 1) is displayed on the bar (e.g., the second type bar 511b), the graphical user interface 660 for switching to the privacy mode may not be displayed on the bar (e.g., the second type bar 511b).

Figure 8B:
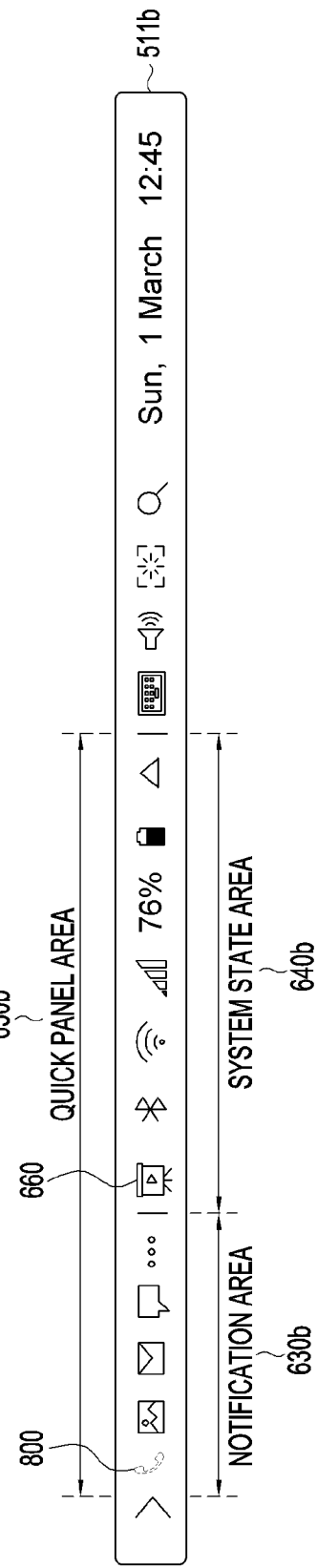

Referring to FIG. 8B, according to various embodiments of the disclosure, the icon 800 displayed on the bar (e.g., the second type bar 511b) may be controlled to blink by the electronic device 101. According to various embodiments of the disclosure, the electronic device 101 may control the icon 800 to blink after the event occurs on the electronic device 101 and until the event is terminated. According to various embodiments of the disclosure, the electronic device 101 may control the icon 800 to blink during a designated time after the event occurs on the electronic device 101. According to various embodiments of the disclosure, various auditory effects (e.g., outputting a ring tone from the electronic device 101 of FIG. 1 and/or the external electronic device 201 of FIG. 2A) or tactile effects (e.g., outputting a vibration from the electronic device 101 of FIG. 1 and/or the external electronic device 201 of FIG. 2A) associated with the occurring event may be output together with the blinking of the icon 800. According to various embodiments of the disclosure, the blinking period of the icon 800 may gradually increase or decrease over time. Or, the blinking may be displayed in the same blinking period regardless of the passage of time. According to various embodiments of the disclosure, the icon 800 may be displayed according to a different display attribute from other interfaces displayed in the quick panel area 650b of the bar (e.g., the second type bar 511b) according to various embodiments of the disclosure. For example, the icon 800 may be displayed in a higher resolution than other interfaces displayed in the notification area 630b or system state area 640b. For example, the icon 800 may be displayed in a size enlarged according to a designated ratio as compared with the other interfaces. According to various embodiments of the disclosure, if the icon 800 associated with the occurring event blinks, the graphical user interface 660 for switching to the privacy mode may not be displayed on the bar (e.g., the second type bar 511b). According to various embodiments of the disclosure, the icon 800 may be displayed on the first type bar 511a.

Figure 8C:
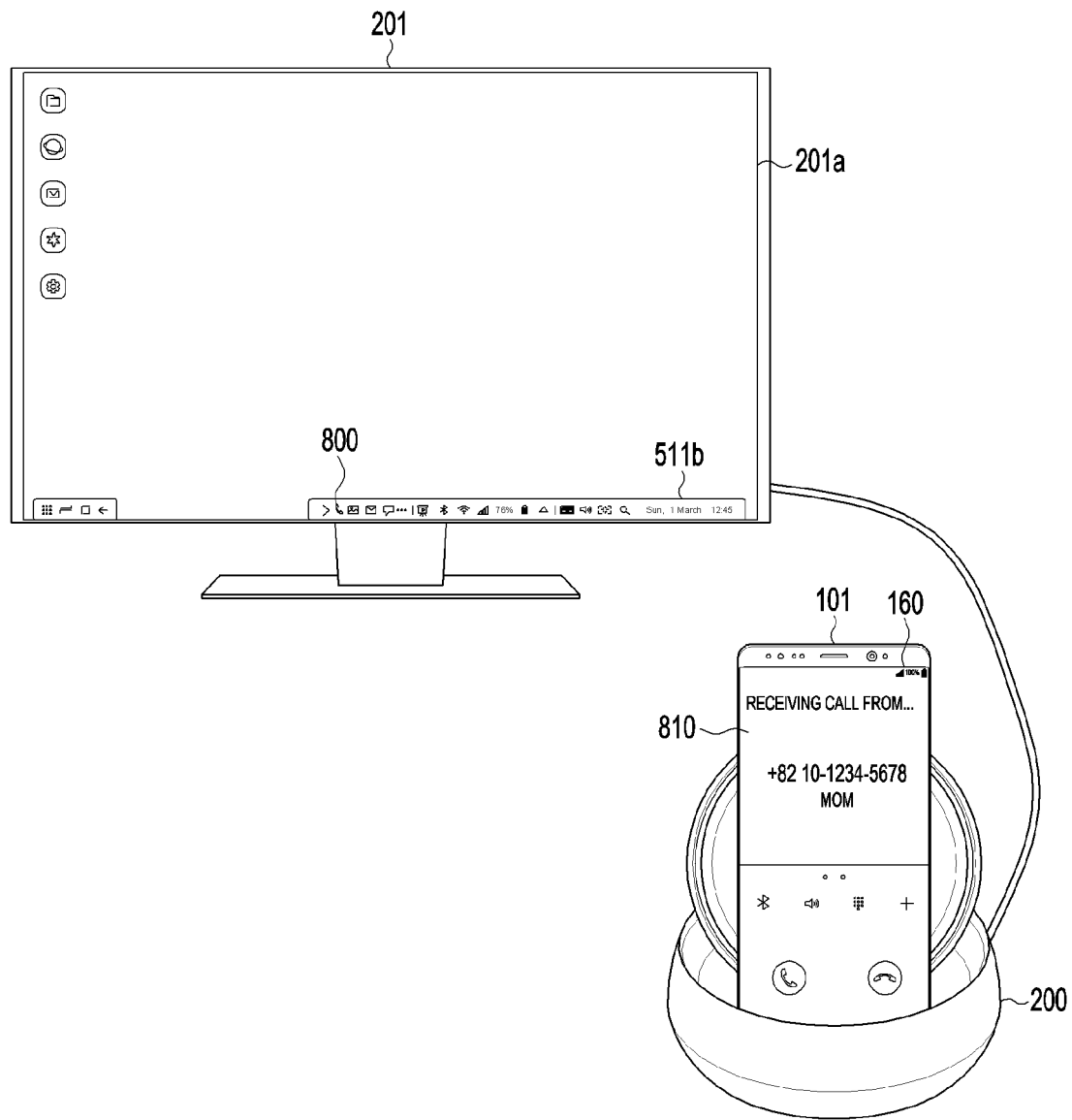

Referring to FIG. 8C, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may display the second type bar 511b on the display device 201a of the external electronic device 201. According to various embodiments of the disclosure, the electronic device 101 may detect an occurrence of an event (e.g., call receiving) associated with an application (e.g., phone application) stored in the memory (e.g., the memory 130 of FIG. 1) of the electronic device 101. According to various embodiments of the disclosure, the electronic device 101 may display an icon 800 associated with the occurring event on the display device 201a of the external electronic device 201. According to various embodiments of the disclosure, a screen 810 regarding the occurring event (e.g., a phone application screen when a call occurs) may be displayed on the display device 160 of the electronic device 101 while the occurring event-associated icon 800 is displayed on the display device 201a of the external electronic device 201. According to various embodiments of the disclosure, the user of the electronic device 101 may identify an event caused by controlling (e.g., touching) the screen displayed on the electronic device 101 (e.g., receiving a call).

Figure 8D:
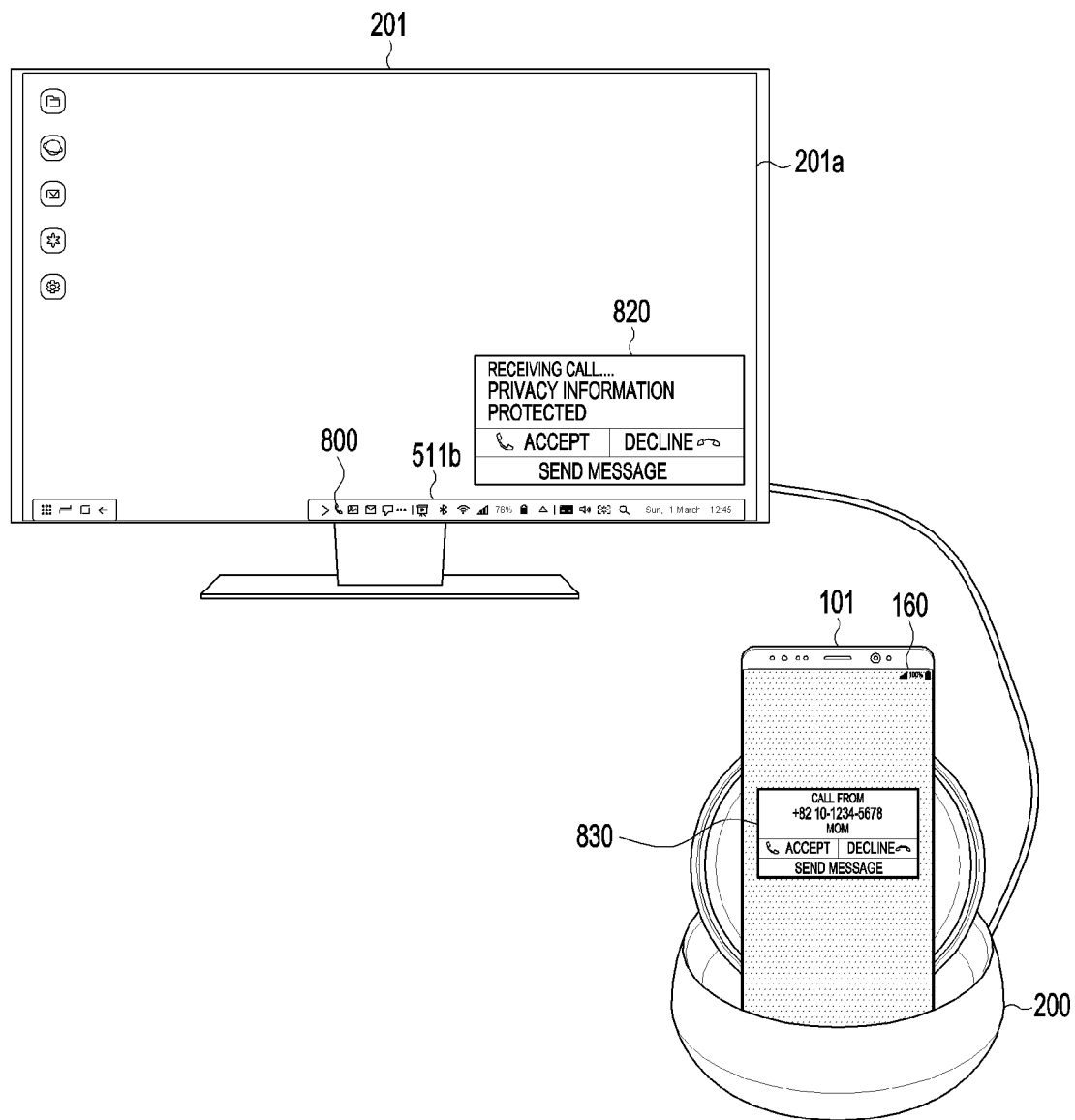

Referring to FIG. 8D, according to various embodiments of the disclosure, the electronic device 101 may display a notification message 820 associated with the event occurring on the electronic device 101 on the display device 201a of the external electronic device 201 while displaying the icon 800 on the bar (e.g., the second type bar 511b). The notification message 820 displayed on the display device 201a of the external electronic device 201 may not include privacy information. According to various embodiments of the disclosure, the event-associated with notification message 830 may be displayed on the display device 160 of the electronic device 101. According to various embodiments of the disclosure, the user of the electronic device 101 may identify the occurring event (e.g., call receiving) by controlling (e.g., touching) the screen displayed on the display device 160 of the electronic device 101. According to various embodiments of the disclosure, a standby screen (e.g., a black screen) may be displayed on the screen displayed on the display device 160 of the electronic device 101.

Figure 8E:
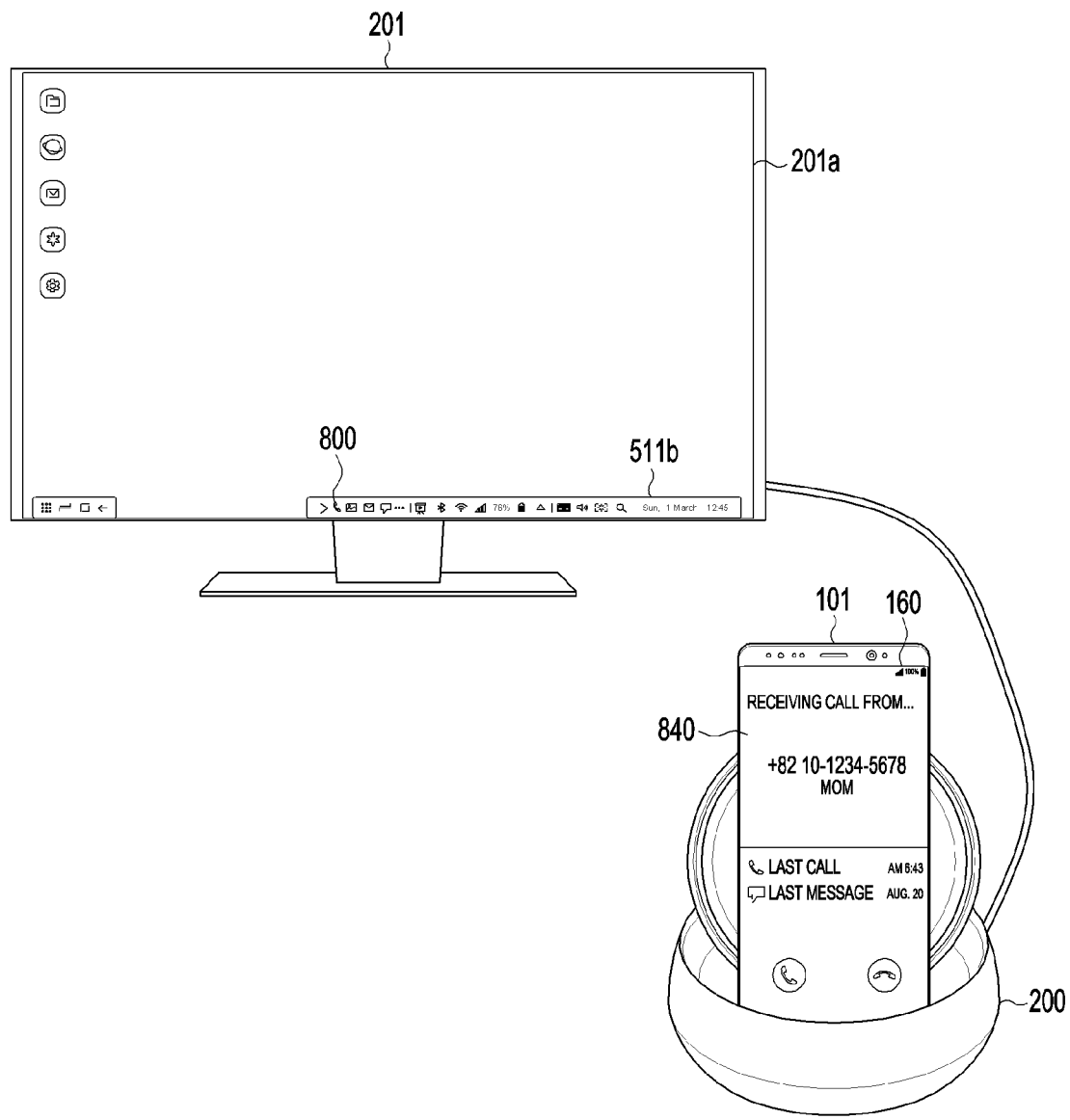
Figure 8F:
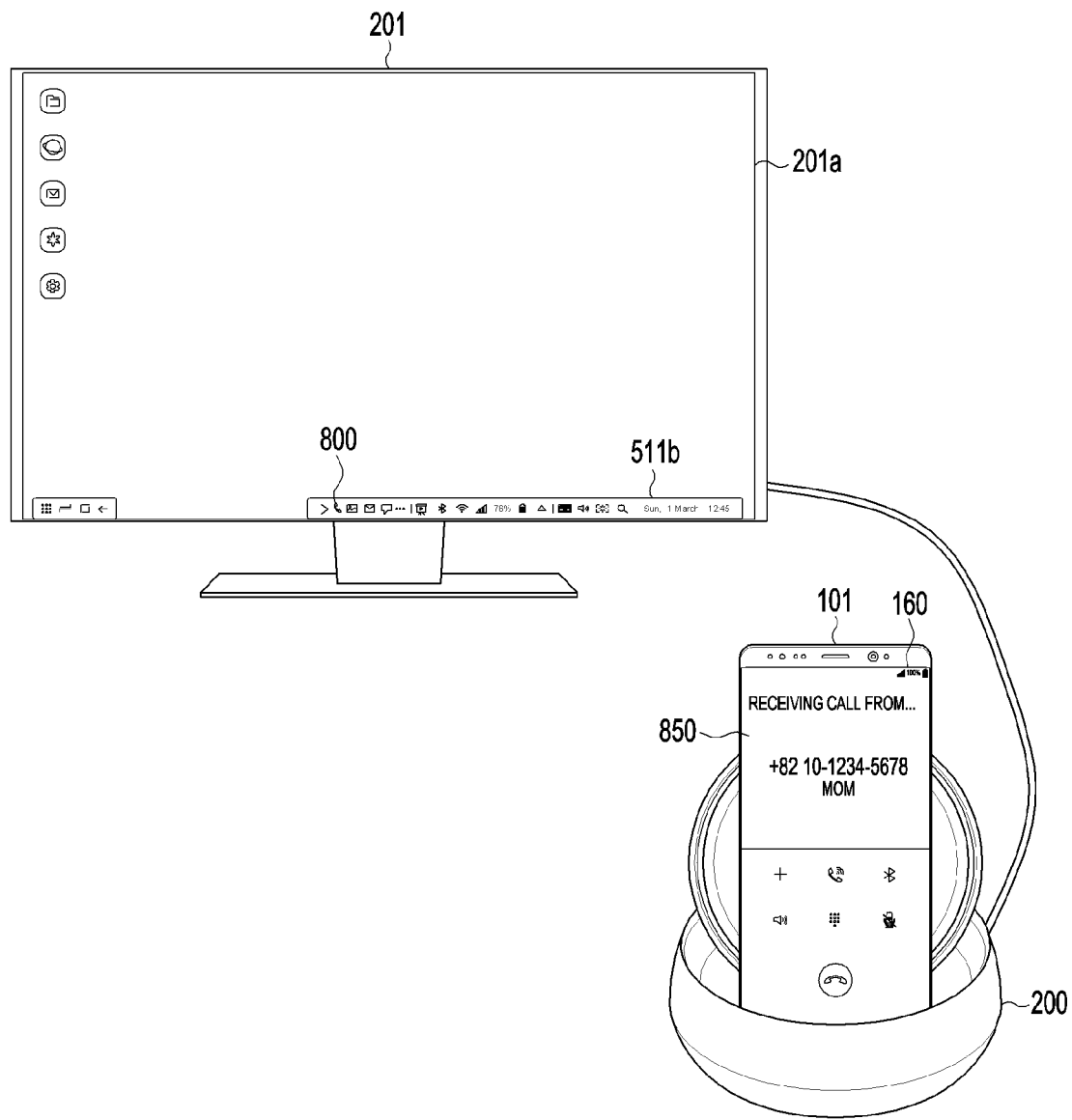

Referring to FIG. 8E, according to various embodiments of the disclosure, the electronic device 101 may display the icon 800 on the bar (e.g., the second type bar 511b). According to various embodiments of the disclosure, the electronic device 101 may display a screen 840 including history information associated with the event occurring on the electronic device 101 on the display device 160 of the electronic device 101. For example, if the occurring event is a call event, the screen 840 including the history information such as the "last call" or "last message" item may be displayed on the display device 160 of the electronic device 101.

Figure 9A:
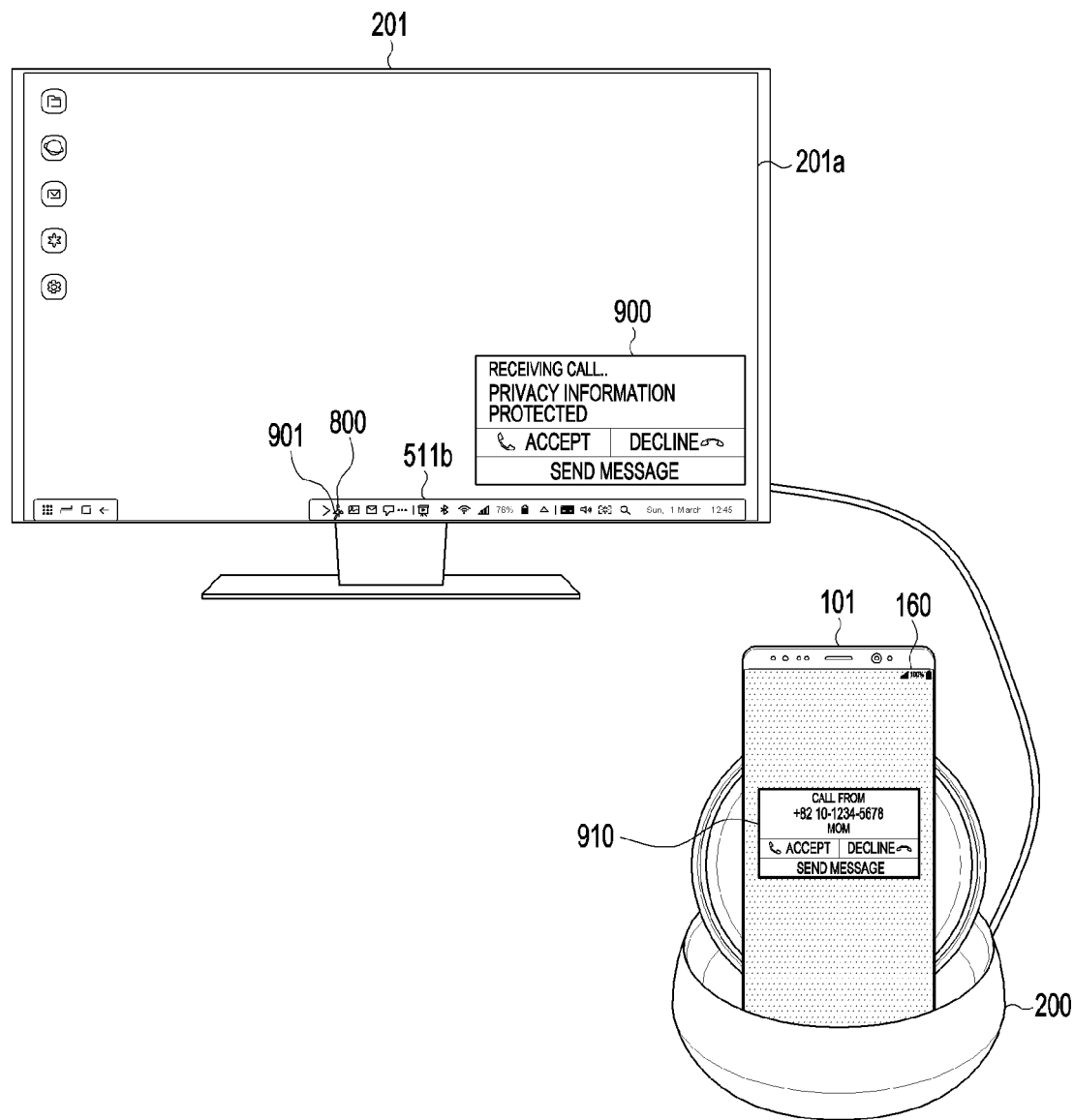
FIGS. 9A and 9B are views illustrating an example operation of displaying privacy information according to a user input in a privacy mode according to various embodiments.
Figure 9B:
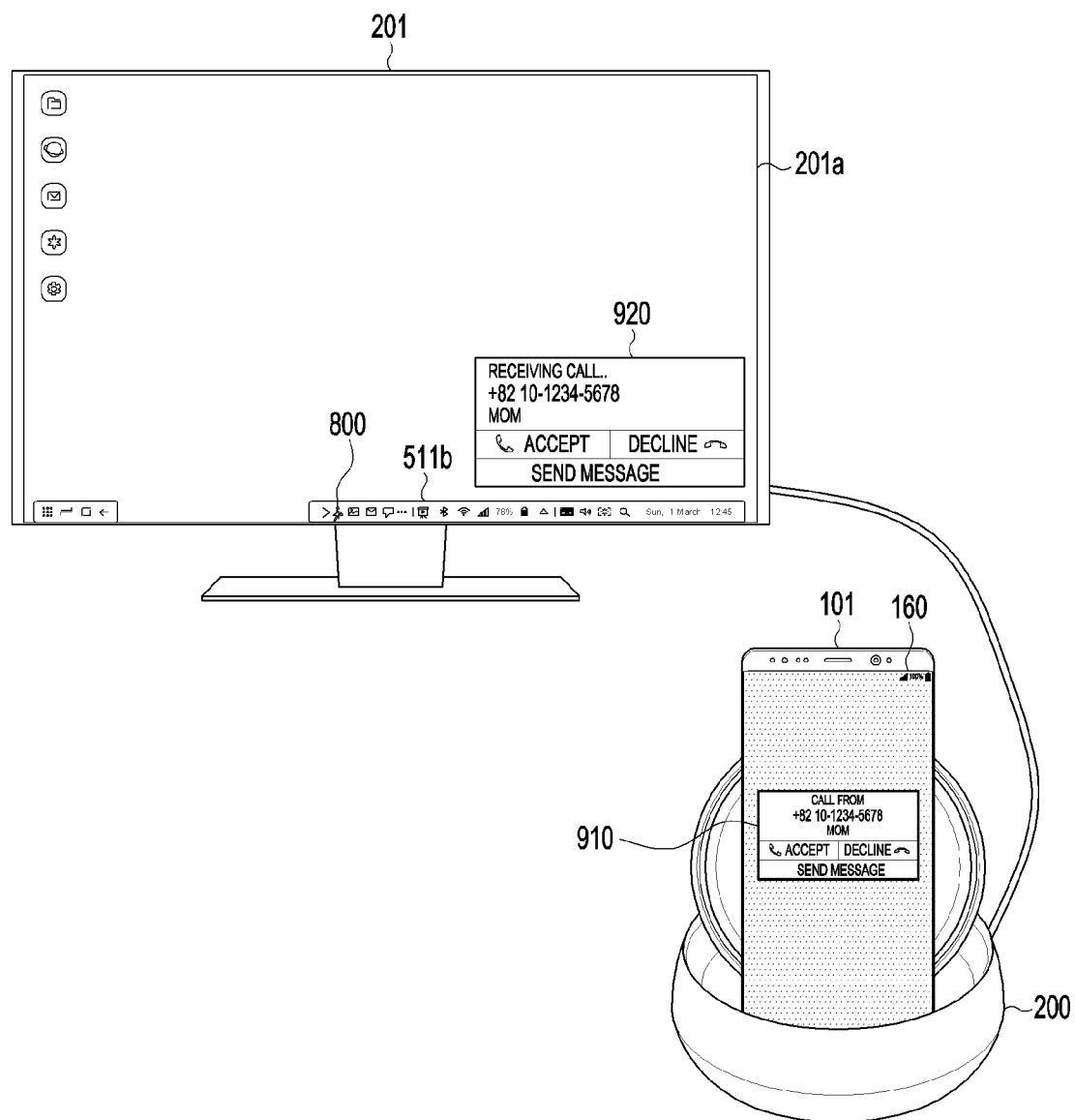

FIGS. 9A and 9B are views illustrating an example operation of displaying privacy information according to a user input in a privacy mode according to various embodiments.

Referring to FIG. 9A, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may display the second type bar 511b on the display device 201a of the external electronic device 201. According to various embodiments of the disclosure, the electronic device 101 may detect an occurrence of an event (e.g., call receiving) associated with an application (e.g., phone application) stored in the memory (e.g., the memory 130 of FIG. 1) of the electronic device 101. According to various embodiments of the disclosure, the electronic device 101 may display an icon 800 associated with the occurring event on the display device 201a of the external electronic device 201. According to various embodiments of the disclosure, the electronic device 101 may display a notification 900 with no privacy information, associated with the occurring event, on the display device 201a of the external electronic device 201. According to various embodiments of the disclosure, the electronic device 101 may display a screen 910 including privacy information, associated with the occurring event, on the display device 160 of the electronic device 101. According to various embodiments of the disclosure, a selection input (e.g., selection by the mouse pointer 901) on the icon 800 may be received via an input device (e.g., a mouse) connected with the electronic device 101 or external electronic device 201. According to various embodiments of the disclosure, the selection input may be performed in various manners.

Referring to FIG. 9B, according to various embodiments of the disclosure, upon receiving the selection input on the icon 800, the electronic device 101 may display a notification message 920 including privacy information on the display device 201a of the external electronic device 201. According to various embodiments of the disclosure, the icon 800 may be displayed on the bar (e.g., the second type bar 511b) while the privacy information-included notification message 920 is displayed on the display device 201a of the external electronic device 201. Or, according to various embodiments of the disclosure, the icon 800 may not be displayed on the bar (e.g., the second type bar 511b) while the privacy information-included notification message 920 is displayed on the display device 201a of the external electronic device 201. According to various embodiments of the disclosure, the electronic device 101 may display a screen 910 including privacy information, associated with the event occurring on the electronic device 101, on the display device 160 of the electronic device 101.

Figure 10:
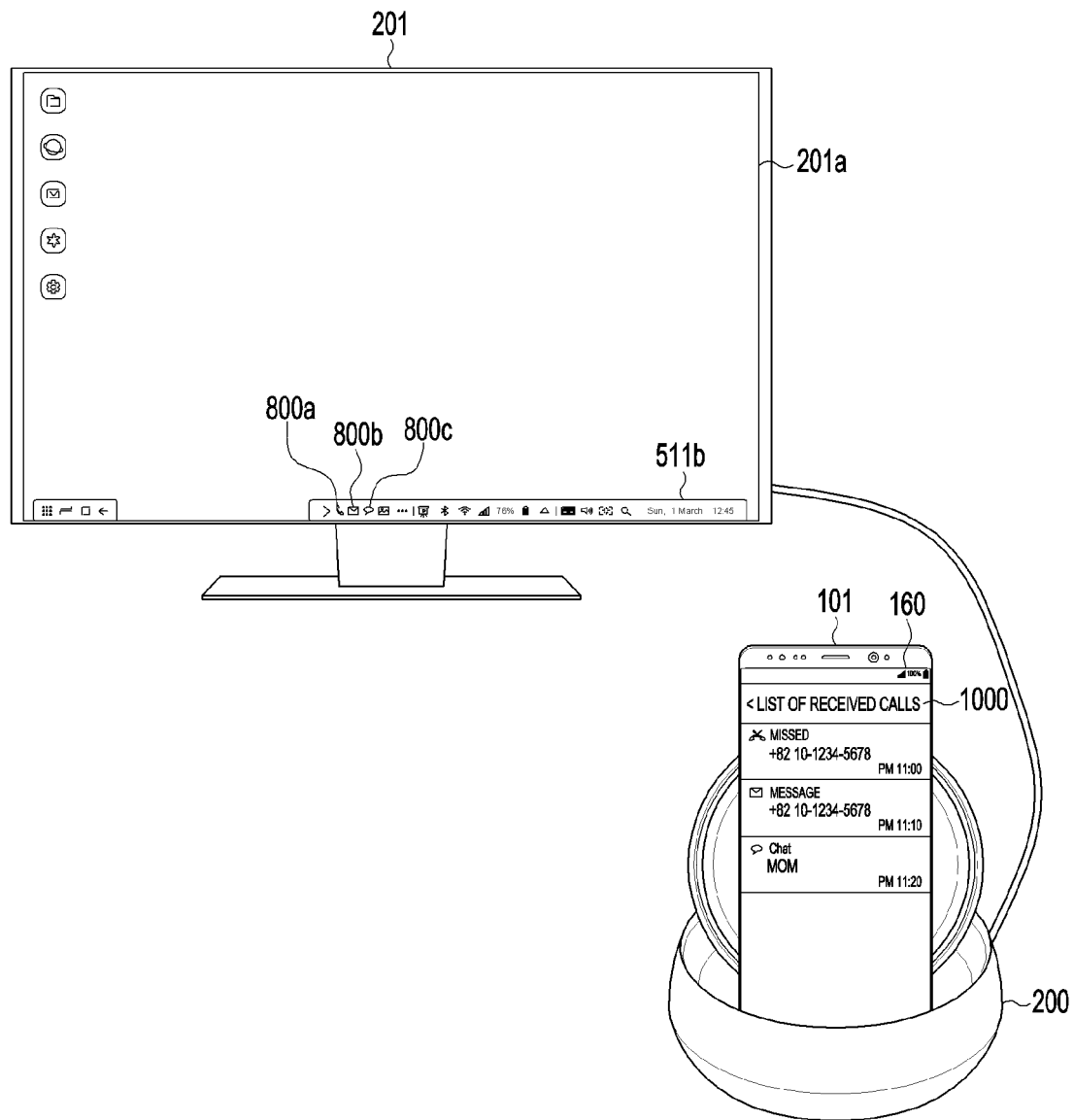
FIG. 10 is a view illustrating an operation of displaying a secure notification in a privacy mode when a plurality of events occur according to various embodiments.

FIG. 10 is a view illustrating an operation of displaying a secure notification in a privacy mode when a plurality of events occur according to various embodiments.

Referring to FIG. 10, according to various embodiments of the disclosure, upon detecting a plurality of events, the electronic device 101 may display icons 800a, 800b, and 800c individually corresponding to the plurality of events on the display device 201a of the external electronic device 201. For example, if a phone application-associated event (e.g., call receiving), an SMS application-associated event (e.g., SMS message receiving), and an SNS application-associated event (e.g., SNS message receiving) occur, the electronic device 101 may display a phone application-associated icon 800a, an SMS application-associated icon 800b, and an SNS application-associated icon 800c on the display device 201a of the external electronic device 201. According to various embodiments of the disclosure, the electronic device 101 may display a screen 1000 including privacy information, associated with the plurality of events, on the display device 160 of the electronic device 101.

According to various embodiments of the disclosure, the icons 800a, 800b, and 800c may be controlled by the electronic device 101 to blink after the events occur and until the events are terminated. Or, according to various embodiments of the disclosure, the icons 800a, 800b, and 800c may be controlled by the electronic device 101 to blink during a designated time after the events occur.

Figure 11A:
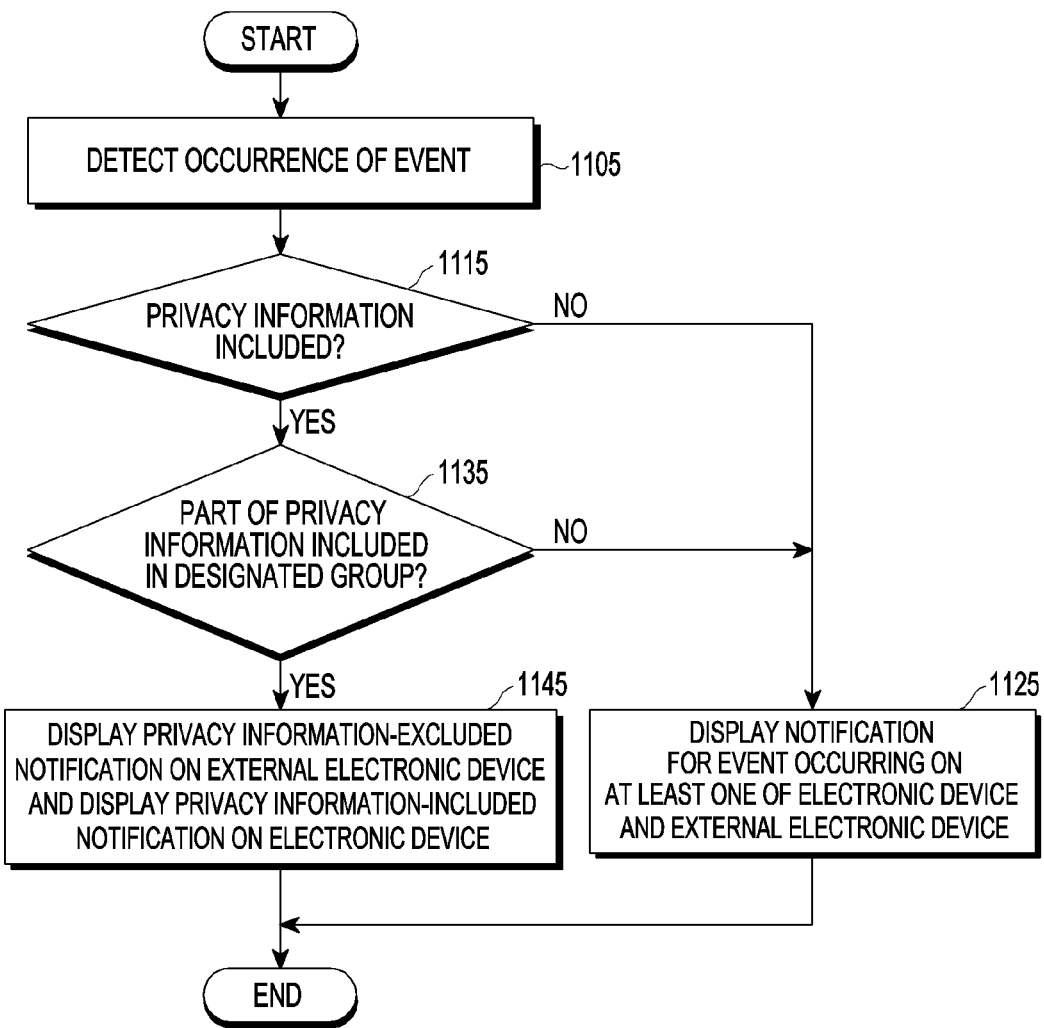
FIGS. 11A and 11B are views illustrating an example operation of displaying privacy information according to a designated condition in a privacy mode according to various embodiments.
Figure 11B:
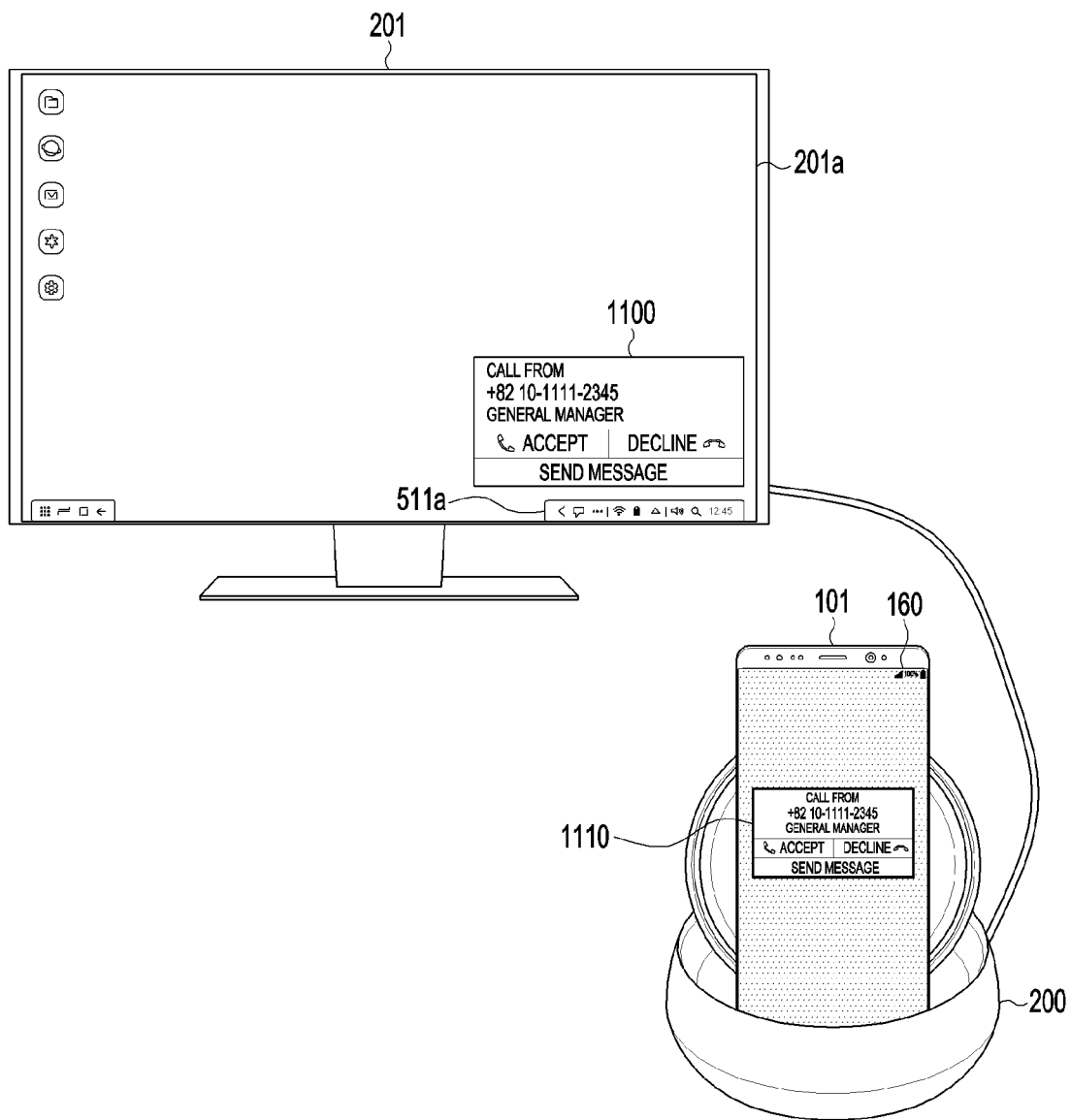

FIGS. 11A and 11B are views illustrating an example operation of displaying privacy information according to a designated condition in a privacy mode according to various embodiments.

Referring to FIG. 11A, according to various embodiments of the disclosure, an electronic device (e.g., the processor 120 of FIG. 1) may detect an occurrence of an event in operation 1105.

According to various embodiments of the disclosure, the electronic device (e.g., the processor 120 of FIG. 1) may determine whether the occurring event includes privacy information in operation 1115. Operation 1115 may be appreciated as the operation of determining whether the notification or screen for providing the occurring event-associated information includes the privacy information or whether the occurring event-associated data includes privacy information-associated data.

According to various embodiments of the disclosure, if the privacy information is not included, the electronic device (e.g., the processor 120 of FIG. 1) may display a notification for the occurring event on at least one of the electronic device (e.g., the display device 160 of FIG. 1) and the external electronic device (e.g., the display device 201a of FIG. 2A) in operation 1125.

According to various embodiments of the disclosure, the electronic device (e.g., the processor 120 of FIG. 1) may determine whether at least part of the privacy information is included in a designated group (in other words, whether it meets a designated condition) in operation 1135. According to various embodiments of the disclosure, for at least some of applications (e.g., Table 1) designated for providing a secure notification, a notification including the privacy information may be provided to the external electronic device 201 in the privacy mode. For example, in the case of the application operated based on the relationship with other user(s), such as the phone application, SMS application, or SNS application, a condition (e.g., setting a contacts group) to allow a privacy information-included notification to be provided via the external electronic device (e.g., the display device 201a of FIG. 2A) in the privacy mode by the user may be set. According to various embodiments of the disclosure, e.g., when a call event occurs, the electronic device (e.g., the processor 120 of FIG. 1) may determine whether the caller is included in the designated contacts group (e.g., company group). Whether it is included in the designated group may be determined based on a group set in the phonebook application.

According to various embodiments of the disclosure, if it is determined in operation 1135 that part (e.g., the caller's name or phone number) of the privacy information is included in the designated group, the electronic device (e.g., the processor 120 of FIG. 1) may display (e.g., as shown in FIGS. 7A to 7C) a notification for the occurring event on at least one of the electronic device (e.g., the display device 160 of FIG. 1) and the external electronic device (e.g., the display device 201a of FIG. 2A) in operation 1125.

According to various embodiments of the disclosure, if it is determined in operation 1135 that nothing in the privacy information is included in the designated group, the electronic device (e.g., the processor 120 of FIG. 1) may display a privacy information-excluded notification on the external electronic device (e.g., the display device 201*a* of FIG. 2A) and a privacy information-included notification on the electronic device (e.g., the display device 160 of FIG. 1) in operation 1145.

Referring to FIG. 11B, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may display the first type bar 511*a* on the display device 201*a* of the external electronic device 201. According to various embodiments of the disclosure, the electronic device 101 may detect a call event in the privacy mode. According to various embodiments of the disclosure, the electronic device 101 may determine whether the caller of the call event is included in a designated group (e.g., company). According to various embodiments of the disclosure, if the caller of the call event is included in the designated group (e.g., general manager), the electronic device 101 may, despite the privacy mode, display the privacy information-included notification message 1100 on the display device 201*a* of the external electronic device 201. According to various embodiments of the disclosure, if the privacy information-included notification message 1100 is displayed on the display device 201*a* of the external electronic device 201, an icon (e.g., the icon 800 of FIG. 8A) for secure notification may be controlled by the electronic device 101 not to be displayed on the bar (e.g., the first type bar 511*a*). According to various embodiments of the disclosure, the privacy information-included notification message 1110 may be displayed on the display device 160 of the electronic device 101.

According to various embodiments of the disclosure, the description in connection with FIGS. 11A and 11B may be applied likewise where an event occurs through a designated application (e.g., company messenger).

Figure 12A:
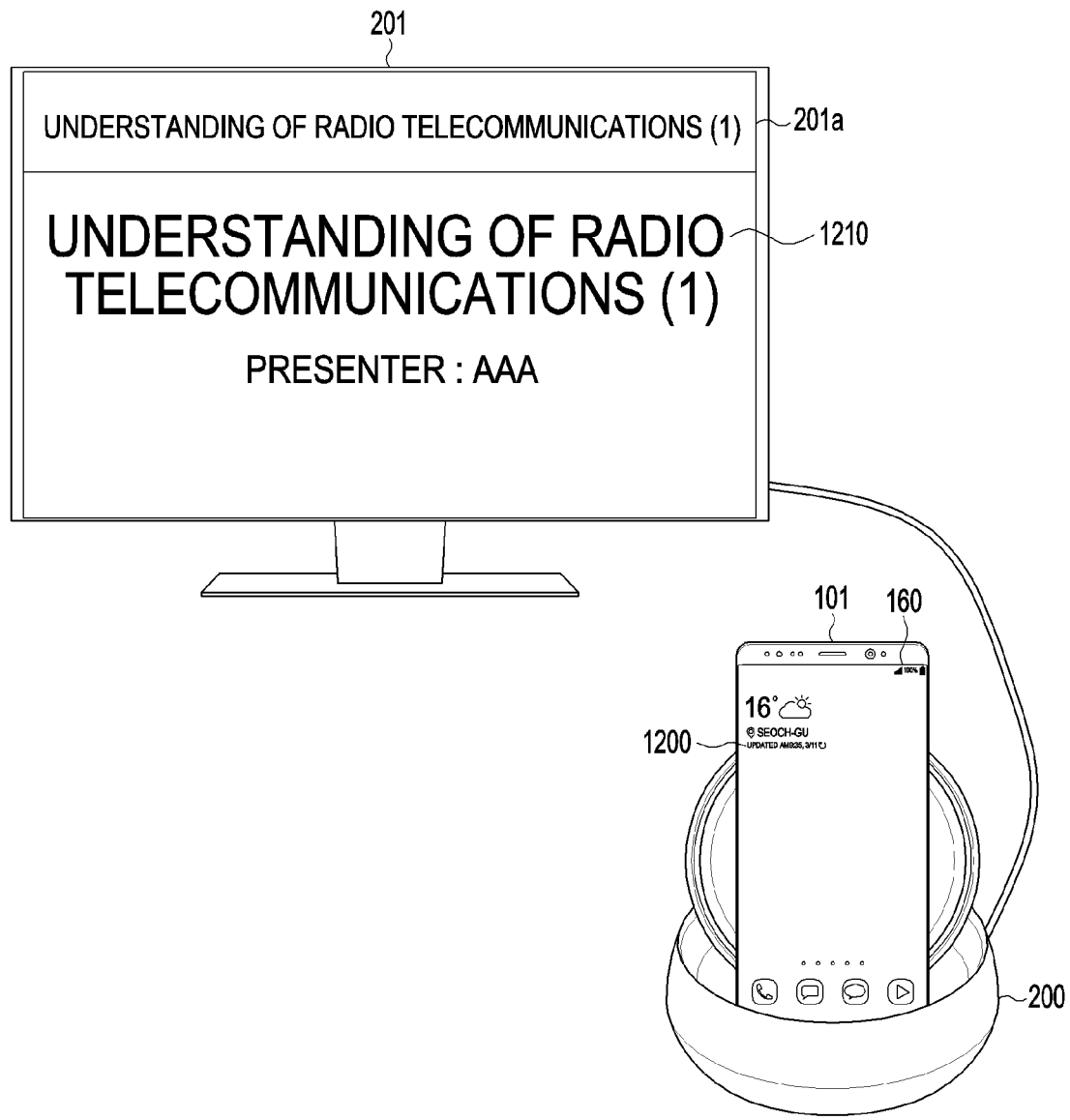
FIGS. 12A to 12C are views illustrating an example in which a designated application runs on an external electronic device and a home screen is displayed on an electronic device according to various embodiments.
Figure 12B:
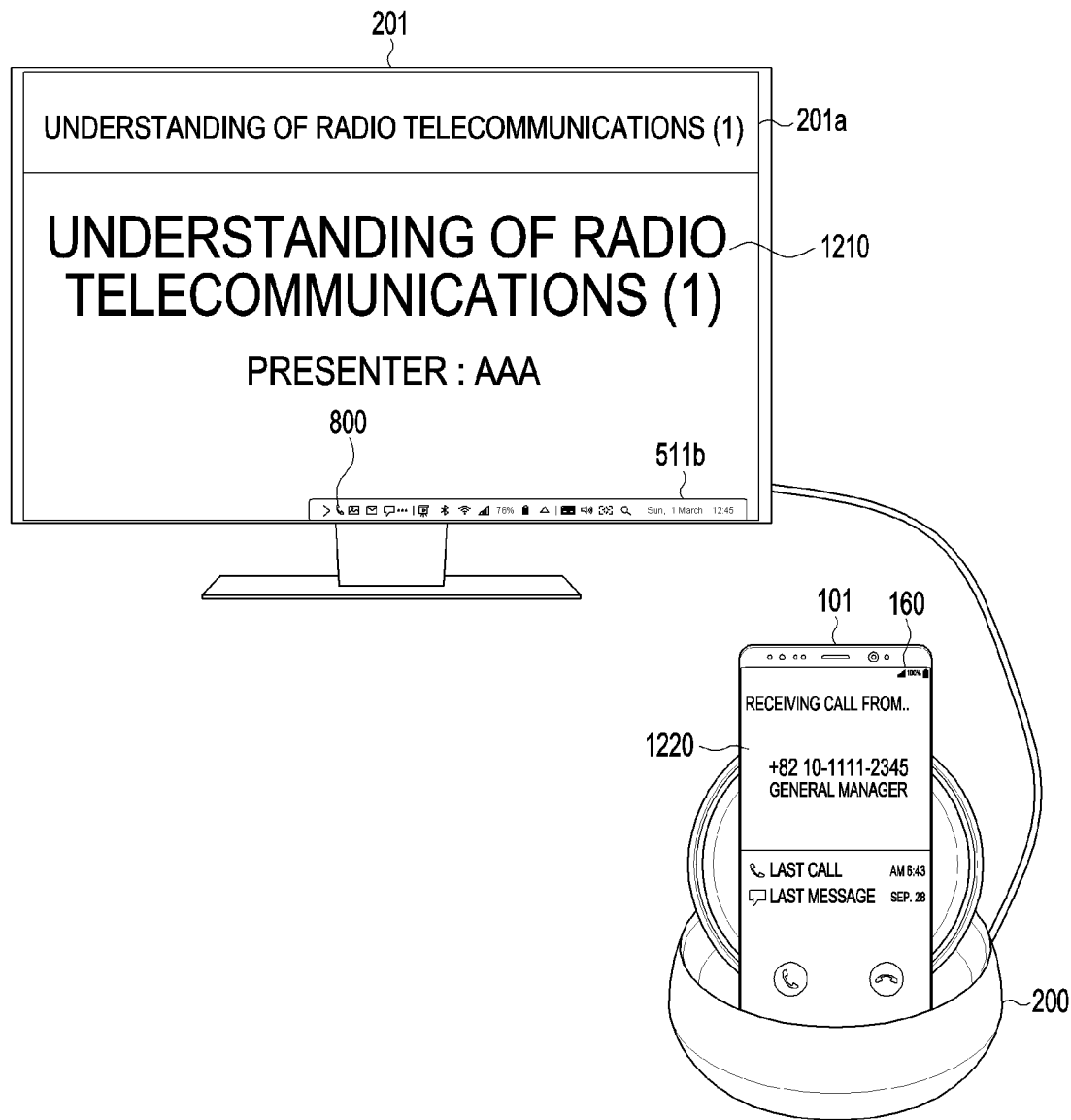
Figure 12C:
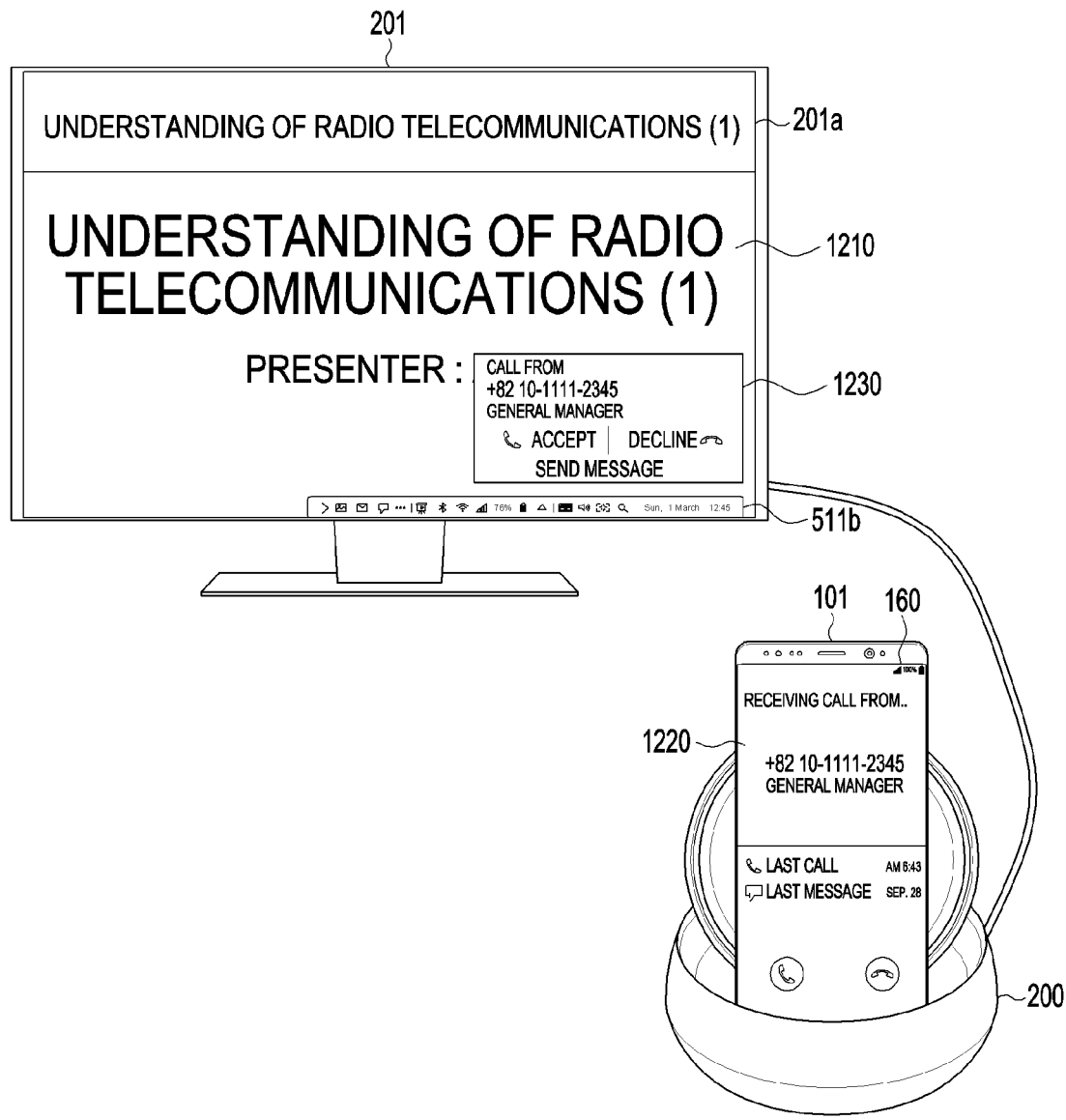

FIGS. 12A to 12C are views illustrating an example in which a designated application runs on an external electronic device 201 and a home screen is displayed on an electronic device 101 according to various embodiments.

Referring to FIG. 12A, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may receive an input of request to run a designated application (e.g., a presentation application). According to various embodiments of the disclosure, the electronic device 101 may display a first screen 1200 on the display device 160 of the electronic device 101. According to various embodiments of the disclosure, the first screen 1200 may include a home screen. The electronic device 101 may perform various functions/operations according to the user's input, with the first screen displayed. According to various embodiments of the disclosure, the electronic device 101 may display a second screen 1210 (e.g., a presentation execution screen), which is an execution screen of the designated application, on the display device 201*a* of the external electronic device 201. According to various embodiments of the disclosure, in the expand mode, the external electronic device 201 may operate as a device for displaying the main screen, and the electronic device 101 may operate as a device for displaying the sub screen as shown in FIGS. 7A to 7C. According to various embodiments of the disclosure, as shown in FIG. 12A, in the expand mode, the electronic device 101 may operate as a device for displaying the main screen, and the external electronic device 201 may operate as a device for displaying the sub screen.

Referring to FIG. 12B, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may detect an event (e.g., a call event) occurring on the electronic device 101. According to various embodiments of the disclosure, the electronic device 101, in the privacy mode, may display a bar (e.g., the second type bar 511*b*) and an icon 800 for notification of the occurring event on the display device 201*a* of the external electronic device 201. According to various embodiments of the disclosure, the electronic device 101 may display a screen 1220 associated with the occurring event on the display device 160 of the electronic device 101.

Referring to FIG. 12C, according to various embodiments of the disclosure, an electronic device 101 may be connected with a sub electronic device 200. According to various embodiments of the disclosure, the electronic device 101 may be connected with the external electronic device 201 via the sub electronic device 200. According to various embodiments of the disclosure, the electronic device 101 may detect an event (e.g., a call event) occurring on the electronic device 101. According to various embodiments of the disclosure, the electronic device 101, in the privacy mode, may determine whether part of the information associated with the occurring event is included in a designated group of the phonebook (contacts) application. According to various embodiments of the disclosure, if the partial information is included in the designated group of the phonebook application in the privacy mode, the electronic device 101 may display a notification message 1230 including the perspective view illustrating on the second screen 1210 displayed on the display device 201*a* of the external electronic device 201. According to various embodiments of the disclosure, the electronic device 101 may display a screen 1220 associated with the occurring event on the display device 160 of the electronic device 101.

Figure 13A:
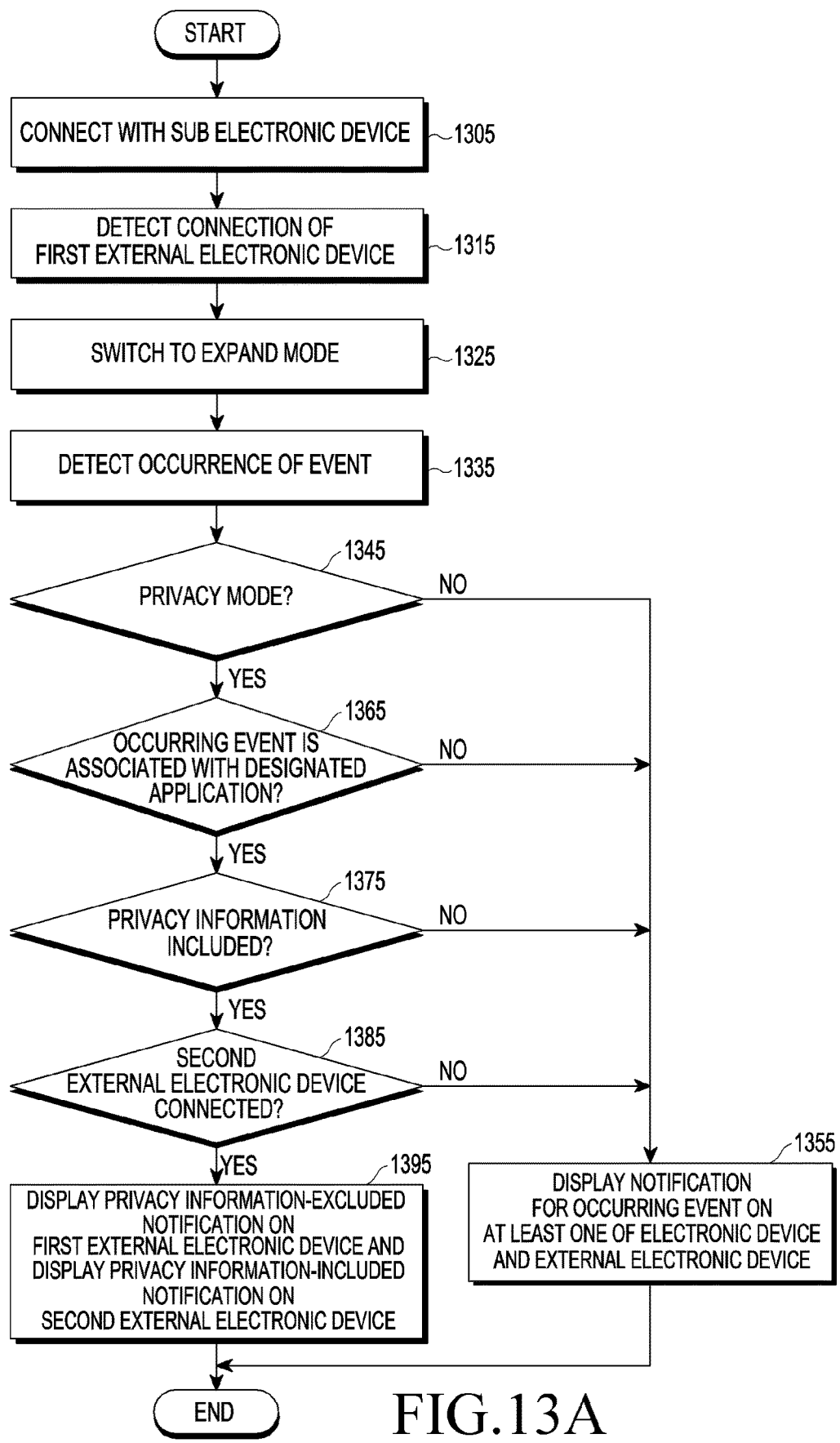
FIGS. 13A and 13B are views illustrating an example operation when an event occurs, with an electronic device and a second external electronic device connected with each other, according to various embodiments.
Figure 13B:
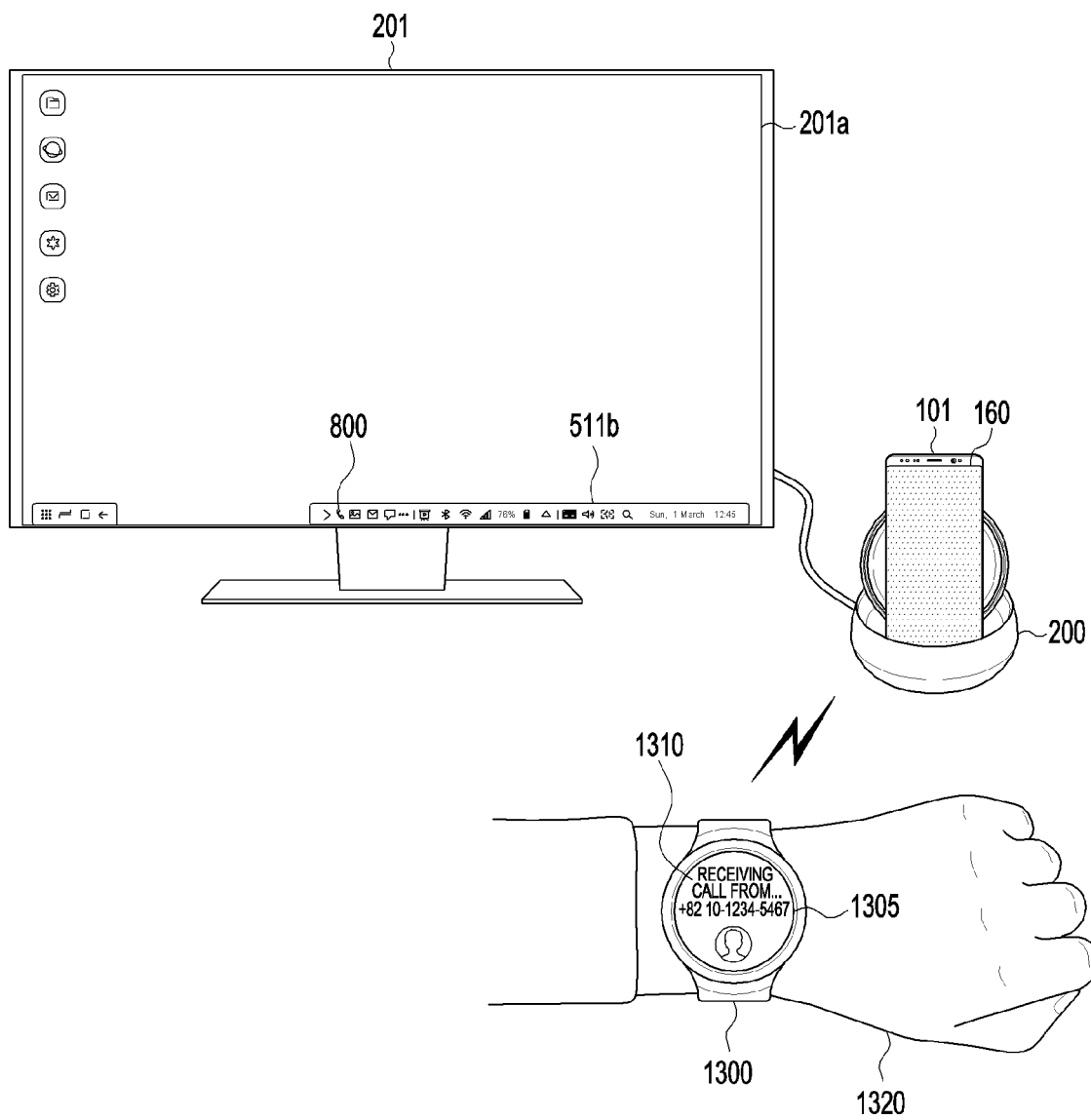

FIGS. 13A and 13B are views illustrating an example operation when an event occurs, with an electronic device (e.g., the electronic device 101 of FIG. 1) and a second external electronic device (e.g., a wearable device) connected with each other, according to various embodiments.

Referring to FIG. 13A, according to various embodiments of the disclosure, an electronic device (e.g., the processor 120 of FIG. 1) may be connected with the sub electronic device 200 via a connector (e.g., the type C connector 205 of FIG. 2B)) in operation 1305.

According to various embodiments of the disclosure, the electronic device (e.g., the processor 120 of FIG. 1) may detect connection of a first external electronic device (e.g., the external electronic device 201 of FIG. 2A) in operation 1315.

According to various embodiments of the disclosure, the electronic device (e.g., the processor 120 of FIG. 1) may switch to an expand mode in operation 1325.

According to various embodiments of the disclosure, the electronic device (e.g., the processor 120 of FIG. 1) may detect an occurrence of an event in operation 1335.

According to various embodiments of the disclosure, the electronic device (e.g., the processor 120 of FIG. 1) may determine whether the current mode of the electronic device is a privacy mode in operation 1345.

According to various embodiments of the disclosure, the electronic device (e.g., the processor 120 of FIG. 1) may display a notification for the occurring event on at least one of the electronic device (e.g., the electronic device 160 of FIG. 1) and the first external electronic device (e.g., the display device 201*a* of FIG. 2A) in operation 1355.

According to various embodiments of the disclosure, the electronic device (e.g., the processor 120 of FIG. 1) may determine whether the occurring event is associated with a designated application in operation 1365.

According to various embodiments of the disclosure, the electronic device (e.g., the processor 120 of FIG. 1) may determine whether the occurring event includes the privacy information in operation 1375.

Besides, the description of operations 300 to 370 of FIG. 3 may be applied to operations 1305 to 1375.

According to various embodiments of the disclosure, the electronic device (e.g., the processor 120 of FIG. 1) may determine whether a second external electronic device (e.g., a wearable device) is connected with the electronic device (e.g., the electronic device 101 of FIG. 1) in operation 1385. According to various embodiments of the disclosure, the second external electronic device may be connected with the electronic device (e.g., the electronic device 101 of FIG. 1) via wired or wireless communication. According to various embodiments of the disclosure, the second external electronic device may be connected with a sub electronic device (e.g., the sub electronic device 200 of FIG. 2A). In this case, information about the second external electronic device may be provided to the electronic device (e.g., the electronic device 101 of FIG. 1) via the sub electronic device (e.g., the sub electronic device 200 of FIG. 2A).

According to various embodiments of the disclosure, the electronic device (e.g., the processor 120 of FIG. 1) may, in operation 1395, display a privacy information-excluded notification on the first external electronic device (e.g., the display device 201*a* of the external electronic device 201 of FIG. 2A) and a privacy information-included notification on the second external electronic device (e.g., a wearable device). According to various embodiments of the disclosure, the operation of displaying the privacy information-included notification on the second external electronic device (e.g., a wearable device) may be controlled by a processor included in the second external electronic device (e.g., a wearable device).

FIG. 13B illustrates an example in which the electronic device 101 is connected with a second external electronic device 1300 (e.g., the smartwatch worn on the user 1320) according to various embodiments of the disclosure. According to various embodiments of the disclosure, the electronic device 101 may be connected with the sub electronic device 200. According to various embodiments of the disclosure, the electronic device 101 may be connected with the external electronic device 201 via the sub electronic device 200. According to various embodiments of the disclosure, the electronic device 101 may detect an event (e.g., a call event) occurring on the electronic device 101. According to various embodiments of the disclosure, the electronic device 101, in the privacy mode, may display a bar (e.g., the second type bar 511*b*) and an icon 800 for notification of the occurring event on the display device 201*a* of the external electronic device 201. According to various embodiments of the disclosure, the electronic device 101 may display a screen 1310 including privacy information on the display device 1305 of the second external electronic device 1300. According to various embodiments of the disclosure, the electronic device 101 may display a standby screen (e.g., a black screen) on the display device 160 of the electronic device 101. According to various embodiments of the disclosure, the electronic device 101 may change the operation mode of the second external electronic device 1300 so that the second external electronic device 1300 outputs no sound (e.g., mute or vibration mode) in the privacy mode. According to various embodiments of the disclosure, if a switch is made from the privacy mode to the normal mode, the electronic device 101 may control the second external electronic device 1300 to switch to the state in which the second external electronic device 1300 may output sound or the sound output mode. According to various embodiments of the disclosure, the electronic device 101 may transmit information regarding the change in operation mode to the second external electronic device 1300 using a communication module (e.g., the communication module 190 of FIG. 1). According to various embodiments of the disclosure, the electronic device 101 may transmit information regarding the occurrence of event using the communication module (e.g., the communication module 190 of FIG. 1). According to various embodiments of the disclosure, the change of the operation mode of the second external electronic device 1300 may be controlled by the processor of the second external electronic device 1300. According to various embodiments of the disclosure, at least some operations (e.g., the operation of changing the operation mode of the second external electronic device 1300 or the operation of displaying the screen 1310 including privacy information) of the descriptions related to the operation of the second external electronic device 1300 in connection with FIG. 13B may be controlled by the processor of the second external electronic device 1300.

Figure 14:
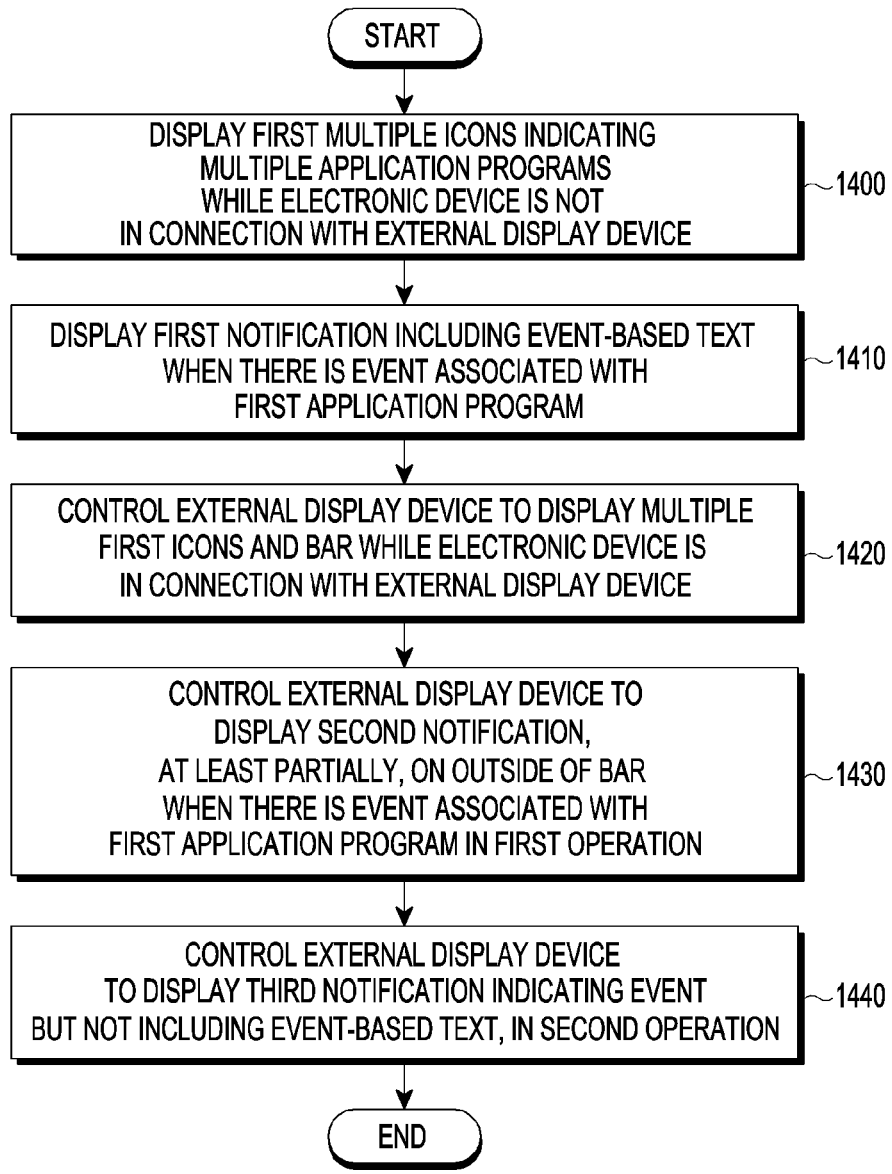
FIG. 14 is a view illustrating an example method of operating an electronic device according to various embodiments.

FIG. 14 is a view illustrating an example method of operating an electronic device (e.g., the electronic device 101 of FIG. 1) according to an embodiment.

According to various embodiments of the disclosure, an electronic device (e.g., the processor 120 of FIG. 1) may display a first plurality of icons indicating a plurality of application programs while the electronic device 101 is not in connection with an external display device (e.g., the external electronic device 201 of FIG. 2A), using the display (e.g., the display device 160 of FIG. 1), in operation 1400. According to various embodiments of the disclosure, in operation 1400, the electronic device (e.g., the processor 120 of FIG. 1) may display the first plurality of icons without displaying a bar.

According to various embodiments of the disclosure, when there is an event associated with a first application program, the electronic device (e.g., the processor 120 of FIG. 1) may display a first notification including text based on the event, using the display (e.g., the display device 160 of FIG. 1) in operation 1410.

According to various embodiments of the disclosure, the electronic device (e.g., the processor 120 of FIG. 1) may display the first plurality of icons and a bar on the external display device (e.g., the display device 201*a* of the external electronic device 201 of FIG. 2A) while the electronic device is in connection with the external display device (e.g., the external electronic device 201 of FIG. 2A) in operation 1420.

According to various embodiments of the disclosure, when there is an event associated with the first application program in a first operation, the electronic device (e.g., the processor 120 of FIG. 1) may display a second notification on the external display device (e.g., the display device 201*a* of the external electronic device 201 of FIG. 2A), at least partially, outside of the bar in operation 1430.

According to various embodiments of the disclosure, the electronic device (e.g., the processor 120 of FIG. 1), in operation 1440, may display a third notification indicating the event but not including the event-based text on the external display device (e.g., the display device 201*a* of the external electronic device 201 of FIG. 2A) in a second operation.

According to various embodiments of the disclosure, even when the electronic device 101 is connected with the external electronic device 201 directly but without relying on the sub electronic device 200, various embodiments for detecting the external electronic device 201 and/or various embodiments for providing a secure notification may be applied.

FIGS. 15A to 15F are views illustrating an example operation when event including privacy information occurs while an electronic device 101 operates as a touch pad according to various embodiments.

Figure 15A:
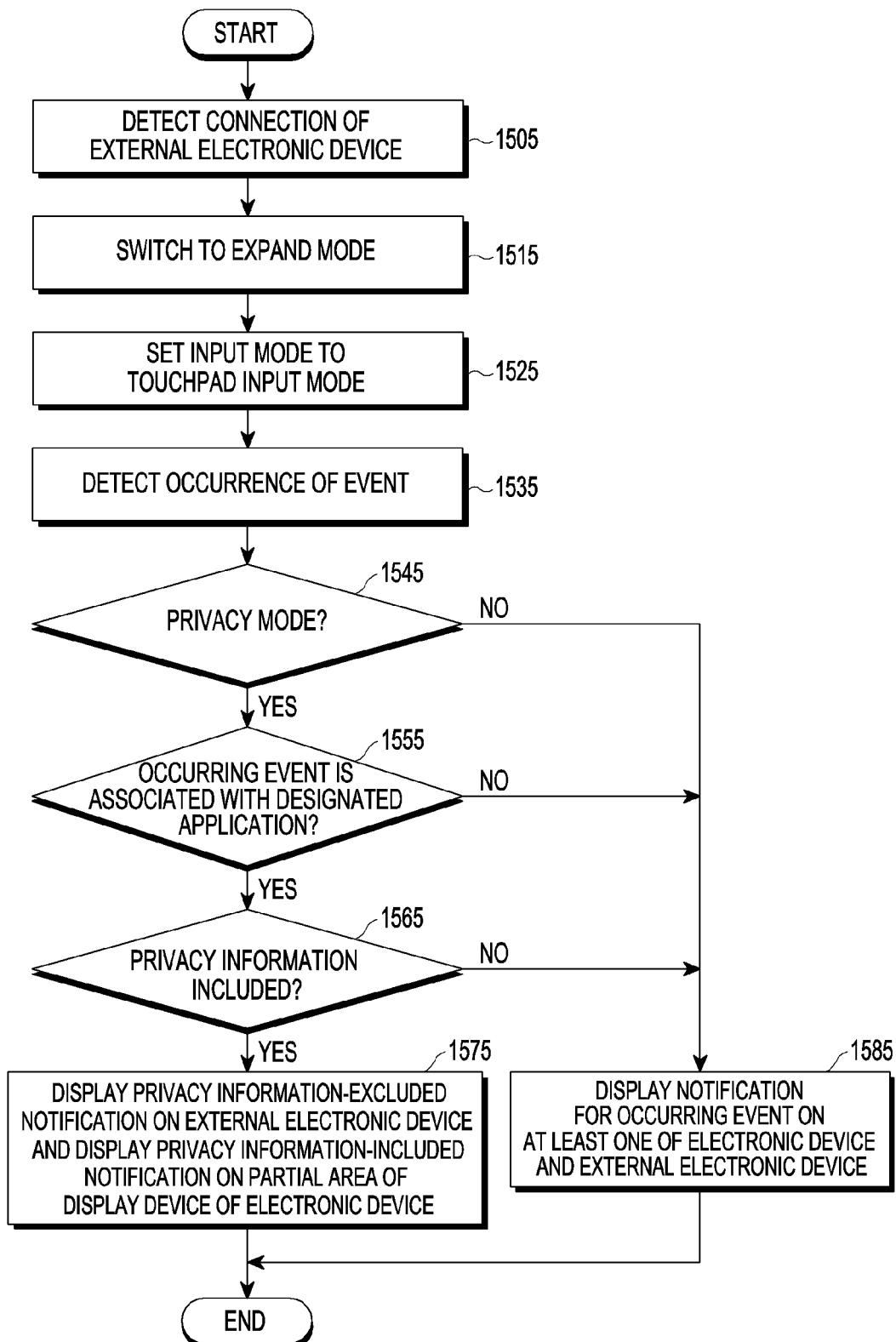
FIGS. 15A to 15F are views illustrating an example operation when an event including privacy information occurs while an electronic device operates as a touch pad according to various embodiments.

Referring to FIG. 15A, according to various embodiments of the disclosure, the electronic device (e.g., the processor 120 of FIG. 1) may detect connection of an external electronic device (e.g., the external electronic device 201 of FIG. 2A) in operation 1505.

According to various embodiments of the disclosure, the electronic device (e.g., the processor 120 of FIG. 1) may, in operation 1515, switch from the normal mode to the expand mode according to the detection of operation 1505.

According to various embodiments of the disclosure, the electronic device (e.g., the processor 120 of FIG. 1) may set the input mode of the electronic device (e.g., the electronic device 101 of FIG. 1) to a touchpad input mode in operation 1525.

According to various embodiments of the disclosure, the electronic device (e.g., the processor 120 of FIG. 1) may detect an occurrence of event for the electronic device (e.g., the electronic device 101 of FIG. 1) in operation 1535.

According to various embodiments of the disclosure, the electronic device (e.g., the processor 120 of FIG. 1) may determine whether the current mode of the electronic device (e.g., the electronic device 101 of FIG. 1) is the privacy mode in operation 1545.

According to various embodiments of the disclosure, if the current mode of the electronic device (e.g., the electronic device 101 of FIG. 1) is the privacy mode, the electronic device (e.g., the processor 120 of FIG. 1) may determine whether the event occurring on the electronic device (e.g., the electronic device 101 of FIG. 1) is associated with a designated application in operation 1555.

According to various embodiments of the disclosure, unless the current mode of the electronic device (e.g., the electronic device 101 of FIG. 1) is the privacy mode, the electronic device (e.g., the processor 120 of FIG. 1) may display a notification for the occurring event on at least one of the electronic device (e.g., the display device 160 of the electronic device 101 of FIG. 1) and the external electronic device (e.g., the display device 201*a* of the external electronic device 201 of FIG. 2A) in operation 1585.

According to various embodiments of the disclosure, if the event occurring on the electronic device (e.g., the electronic device 101 of FIG. 1) is associated with the designated application, the electronic device (e.g., the processor 120 of FIG. 1) may determine whether the event occurring on the electronic device (e.g., the electronic device 101 of FIG. 1) includes privacy information in operation 1565.

According to various embodiments of the disclosure, unless the event occurring on the electronic device (e.g., the electronic device 101 of FIG. 1) is associated with the designated application, the electronic device (e.g., the processor 120 of FIG. 1) may display a notification for the occurring event on at least one of the electronic device (e.g., the display device 160 of the electronic device 101 of FIG. 1) and the external electronic device (e.g., the display device 201*a* of the external electronic device 201 of FIG. 2A) in operation 1585.

According to various embodiments of the disclosure, if the event occurring on the electronic device (e.g., the electronic device 101 of FIG. 1) includes the privacy information, the electronic device (e.g., the processor 120 of FIG. 1) may display a privacy information-excluded notification on the external electronic device (e.g., the display device 201*a* of the external electronic device 201 of FIG. 2A) and a privacy information-included notification on a partial area of the electronic device (e.g., the display device 160 of the electronic device 101 of FIG. 1) in operation 1575.

According to various embodiments of the disclosure, unless the event occurring on the electronic device (e.g., the electronic device 101 of FIG. 1) includes the privacy information, the electronic device (e.g., the processor 120 of FIG. 1) may display a notification for the occurring event on at least one of the electronic device (e.g., the display device 160 of the electronic device 101 of FIG. 1) and the external electronic device (e.g., the display device 201*a* of the external electronic device 201 of FIG. 2A) in operation 1585.

According to various embodiments of the disclosure, at least one operation (e.g., operations 1545, 1555, and 1565) shown in FIG. 15A may be changed in order and performed.

Figure 15B:
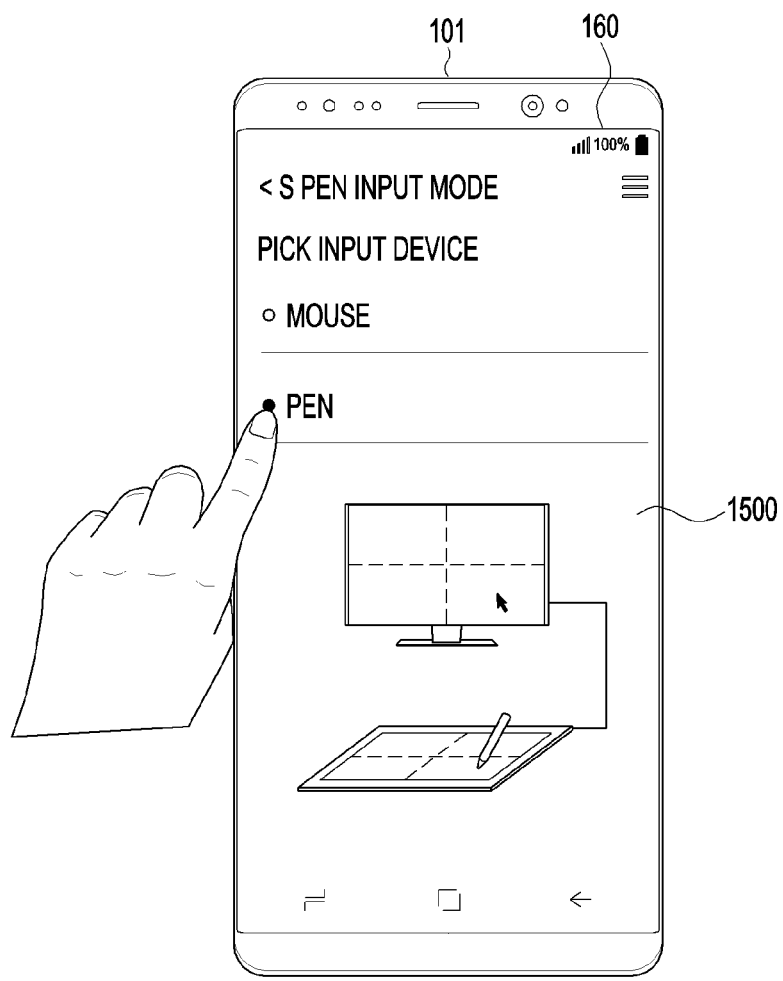

Referring to FIG. 15B, according to various embodiments of the disclosure, the electronic device 101 may receive a selection input for using the electronic device 101 as a touchpad from the user (e.g., the user 1320 of FIG. 13B) in the expand mode. As used herein, when the electronic device 101 is operated as a touchpad according to the selection input for using the electronic device 101 as a touchpad, it may be simply referred to as a "touchpad input mode." According to various embodiments of the disclosure, if the electronic device 101 operates in the touchpad input mode, the electronic device 101 may receive an input for controlling various objects or screen displayed on the external electronic device (e.g., the display device 201*a* of the external electronic device 201 of FIG. 2A) using an auxiliary input device (e.g., Samsung Galaxy S-pen™) related to the electronic device 101. According to various embodiments of the disclosure, the electronic device 101 may display, on the display device 160, an input mode setting screen 1500 for receiving the selection input for operating in the touchpad input mode from the user. According to various embodiments of the disclosure, if a selection input for auxiliary input device (e.g., a pen) is received from the user as shown in FIG. 15B, the electronic device 101 may operate in the touchpad input mode.

Figure 15C:
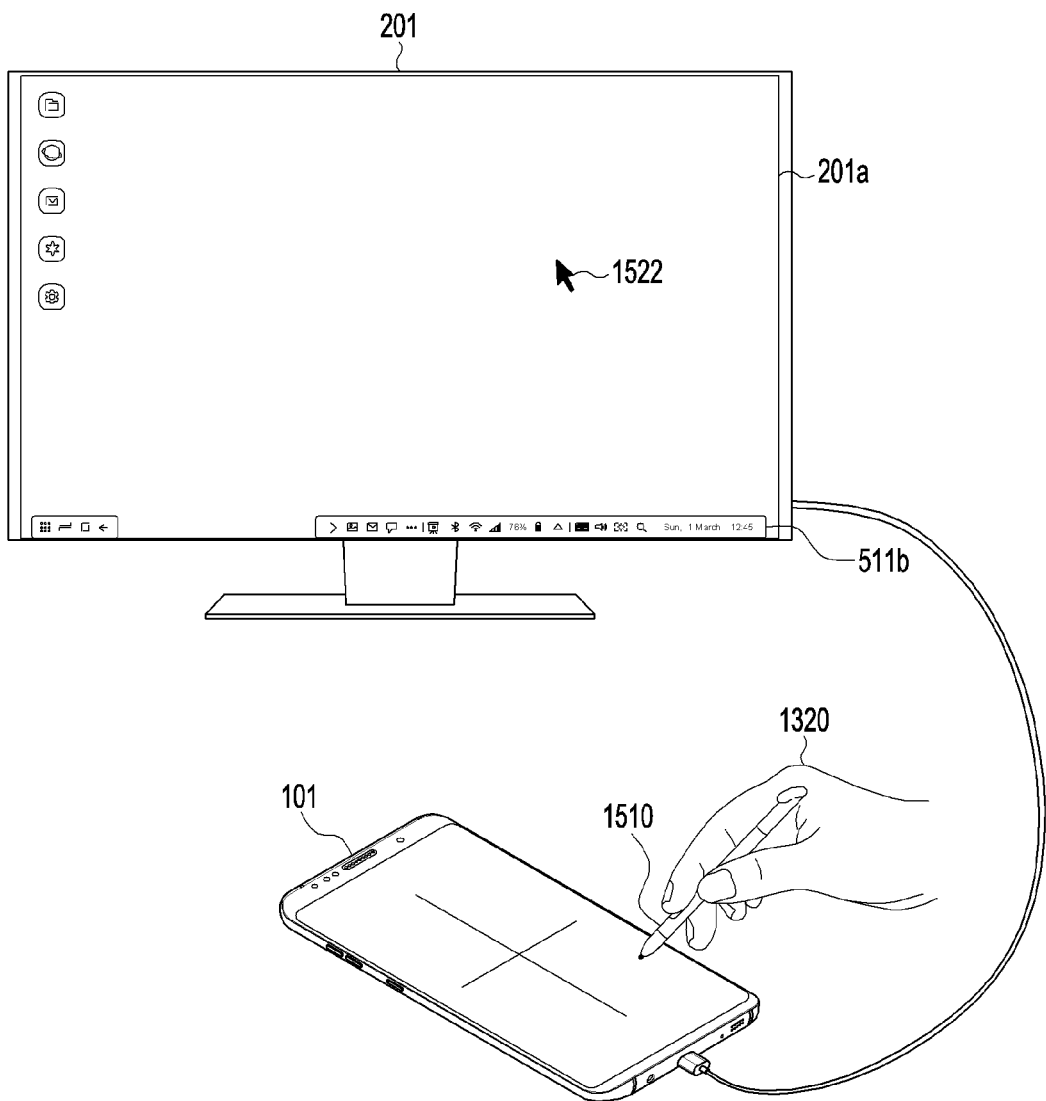

Referring to FIG. 15C, according to various embodiments of the disclosure, the electronic device 101 may receive an input (e.g., a touch input using the auxiliary input device 1510) for controlling various objects or screen displayed on the display device 201*a* of the external electronic device 201 via the auxiliary input device 1510 from the user 1320 in the touchpad input mode. According to various embodiments of the disclosure, the electronic device 101 may display a pointer 1522 displayed on the display device 201a of the external electronic device 201, corresponding to the movement of the auxiliary input device 1510. According to various embodiments of the disclosure, if the electronic device 101 operates as touchpad, the display device 160 may be operated as an area for receiving touch input. According to various embodiments of the disclosure, if the electronic device 101 operates as touchpad, a designated screen may be displayed on the display device 160. According to various embodiments of the disclosure, if the electronic device 101 is operated as touchpad, as the designated screen, a standby screen (e.g., a black screen), a screen in a designated color (e.g., gray), a screen where a designated object (e.g., a dashed line or solid line) is displayed on a screen in a designated color, or other various screens may be displayed. According to various embodiments of the disclosure, if the designated screen is a standby screen, the phrase "designated is displayed" may be replaced with "display device 160 is turned off." In FIG. 15C, the crossed solid lines on the display device 160 indicate an example in which the electronic device 101 is currently operating in the touchpad mode. According to various embodiments of the disclosure, the pointer 1530 is shown as an example. According to various embodiments of the disclosure, various user interfaces for controlling various objects displayed on the external electronic device 201 may be displayed on the display device 201a interchangeably/alternatively with the pointer 1530.

Figure 15D:
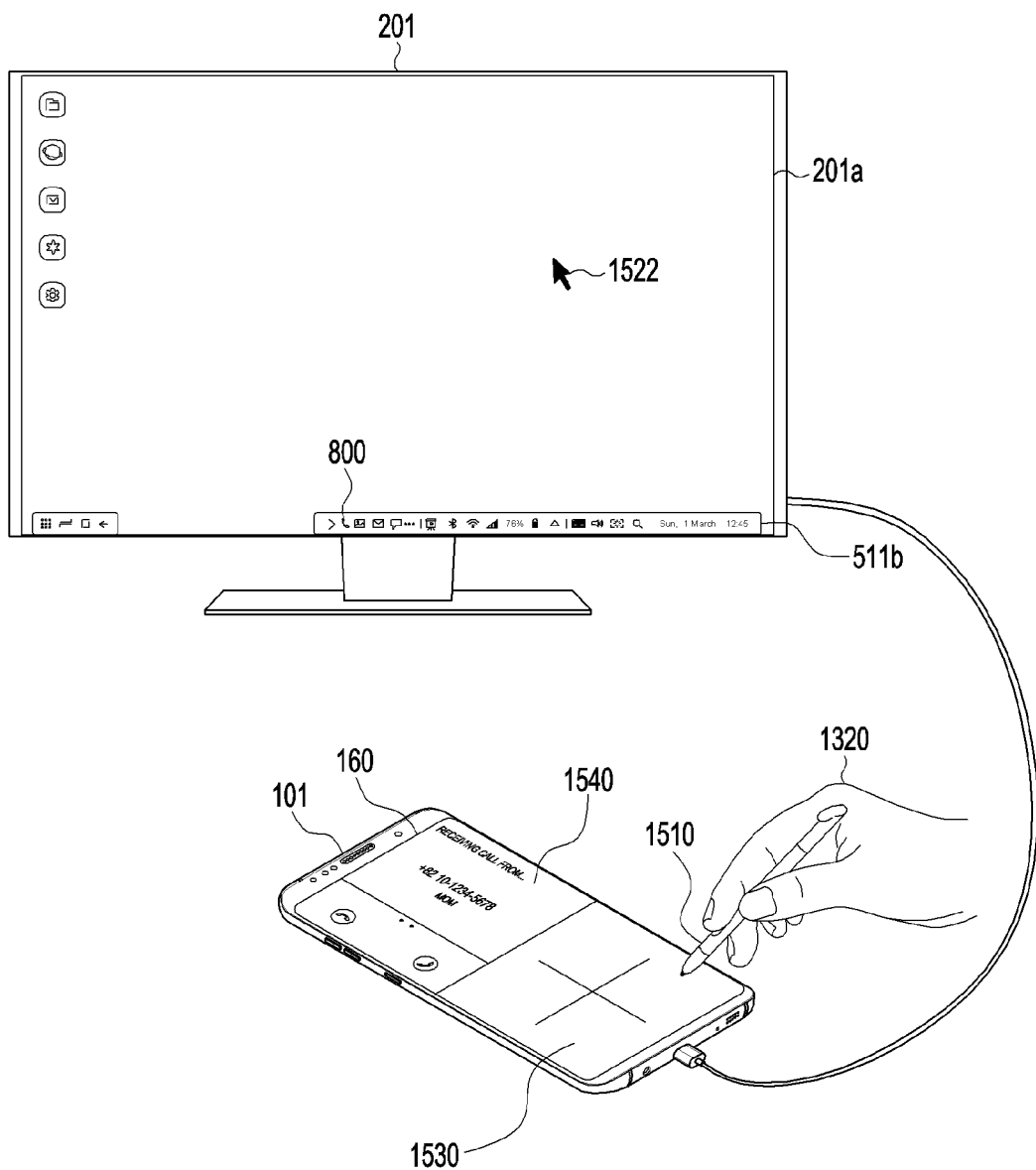

Referring to FIG. 15D, according to various embodiments of the disclosure, the electronic device 101 may detect an occurrence of event (e.g., call receiving) related to a designated application (e.g., phone application) in the privacy mode. According to various embodiments of the disclosure, if the designated application includes privacy information (e.g., the caller's phone number), the electronic device 101 may display a screen 1540 including the privacy information on a partial area of the display device 160. In other words, according to various embodiments of the disclosure, the display device 160 may include an area (in other words, a first area) where the privacy information-included screen 1540 is displayed and an area 1530 (in other words, a second area) which is operated as a touchpad. According to various embodiments of the disclosure, the electronic device 101 may display an icon 800 associated with the event occurring on the electronic device 101 on a bar (e.g., the second type bar 511b) on the display device 201a of the external electronic device 201. According to various embodiments of the disclosure, the electronic device 101 may control the icon 800 to blink. According to various embodiments of the disclosure, the size (in other words, area) of the first area and the second area may be designated during the process of manufacturing the electronic device 101 or by the user.

Figure 15E:
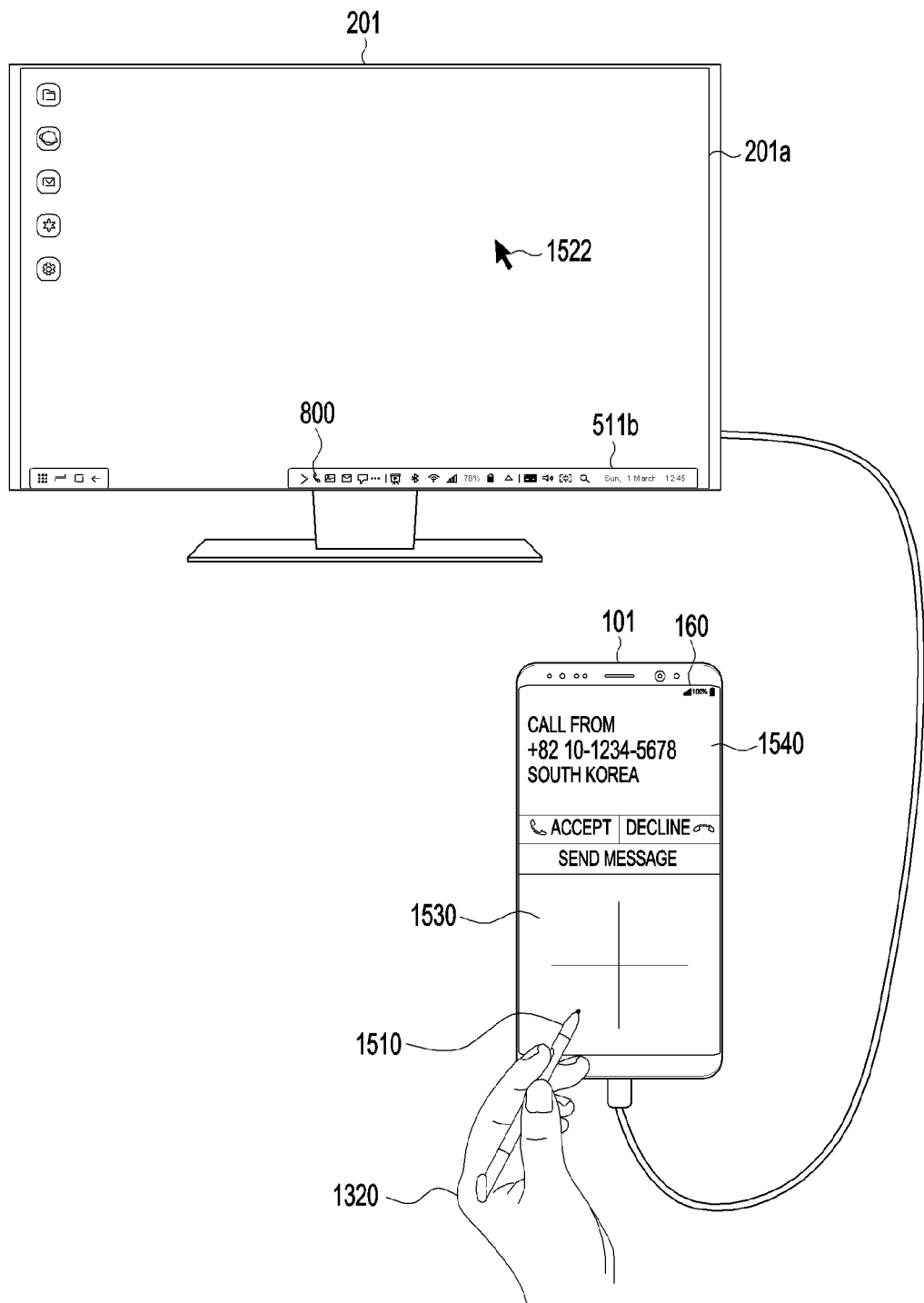

Referring to FIG. 15E, according to various embodiments of the disclosure, if the electronic device 101 is reoriented (e.g., from the landscape to portrait mode), the first area and the second area may also be reoriented. According to various embodiments of the disclosure, corresponding to the reorientation of the first area and second area, the privacy information-included screen 1540 may be updated and displayed in the first area.

Figure 15F:
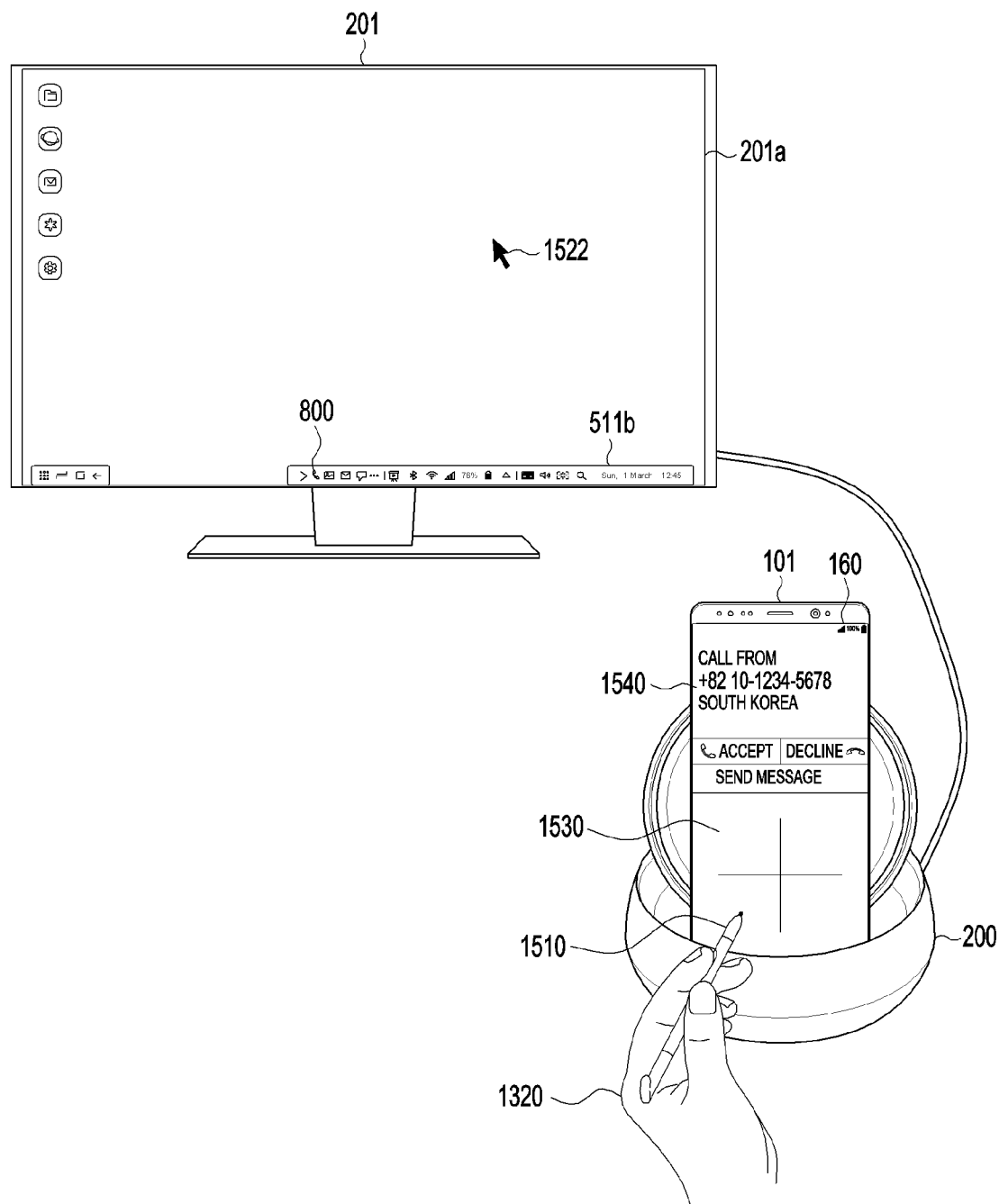

Referring to FIG. 15F, according to various embodiments of the disclosure, even when the electronic device 101 is connected with the external electronic device 201 via the sub electronic device 200 (or the dongle 400), various embodiments described above in connection with FIGS. 15A to 15E may be applied likewise.

According to various embodiments of the disclosure, an electronic device comprises a housing including a first surface and a second surface facing away from the first surface, a touchscreen display exposed through a portion of the first surface, at least one wireless and/or wired communication circuit disposed in the housing, at least one processor electrically connected with the communication circuit and the display and disposed in the housing, and a memory electrically connected with the processor and disposed in the housing, wherein the memory is configured to store a plurality of application programs including a first application program, and wherein the memory stores instructions that, when executed, enable the processor to, while the electronic device is not in electrical connection with an external display device, display a first plurality of icons indicating the plurality of application programs on the touchscreen display without displaying a bar and, when there is an event associated with the first application program, display a first notification including the text based on the event on the touchscreen display, and while the electronic device is in electrical connection with the external display device via the communication circuit, enable the external display to display the first plurality of icons and bar, when there is the event associated with the first application program, in a first operation, enable the external display to display a second notification, at least partially, at an outside of the bar, the second notification appropriate for the external display and including the event-based text, in a second operation, enable the external display to display a third notification indicating the event but not including the event-based text.

According to various embodiments of the disclosure, the third notification may include an icon in the bar.

According to various embodiments of the disclosure, the instructions may enable the processor to blink the icon.

According to various embodiments of the disclosure, the first application program may include at least one of an email application program, a phone application program, a calendar application program, a reminder application program, a messenger application program, an SNS application program, and a texting application program.

According to various embodiments of the disclosure, when the electronic device is electrically connected with the external display via the wired communication circuit, the instructions may enable the processor to perform only the second operation.

According to various embodiments of the disclosure, when the electronic device is electrically connected with the external display via a dock, the instructions may enable the processor to perform only the second operation.

According to various embodiments of the disclosure, the instructions may enable the processor to display the first notification on the touchscreen display.

According to various embodiments of the disclosure, the instructions may enable the processor to display a fourth notification including the event-based text on the touchscreen display, and the fourth notification may differ in at least one display attribute from the first notification.

According to various embodiments of the disclosure, the instructions may enable the processor to display the fourth notification on a first area and to allow a second area of the touchscreen display to serve as a touch input device.

According to various embodiments of the disclosure, the first notification and the second notification may have at least one different display attribute, and the at least one display attribute may include at least one of resolution, number of screens, direction of screen, position of displayed object on screen, brightness of screen, color of object, shape of object, contrast, or screen size.

According to various embodiments of the disclosure, upon receiving a select input for the icon, the instructions may enable the processor to display the event-based text on the external display.

According to various embodiments of the disclosure, a computer-readable recording medium may include at least one operation that may include, while an electronic device is not in electrical connection with an external display device, displaying a first plurality of icons indicating a plurality of application programs on a touchscreen display of the electronic device without displaying a bar and, when there is an event associated with a first application program, displaying a first notification including text based on the event on the touchscreen display, and while the electronic device is in electrical connection with the external display device, enabling the external display device to display the first plurality of icons and bar, when there is the event associated with the first application program, in a first operation, enabling the external display device to display a second notification, at least partially, at an outside of the bar, the second notification appropriate for the external display device and including the event-based text, in a second operation, enabling the external display device to display a third notification indicating the event but not including the event-based text.

According to various embodiments of the disclosure, an electronic device comprises a housing including a first surface and a second surface facing away from the first surface, a touchscreen display exposed through a portion of the first surface, at least one wireless and/or wired communication circuit disposed in the housing, at least one processor electrically connected with the communication circuit and the display and disposed in the housing, and a memory electrically connected with the processor and disposed in the housing, wherein the memory is configured to store a plurality of application programs including a first application program, and wherein the memory stores instructions that, when executed, enable the processor to, while the electronic device is in electrical connection with an external display device via the communication circuit, enable the external display device to display at least one icon and bar, when there is an event associated with the first application program, enable the external display device to display a first notification indicating the event but not including the event-based text, and display a second notification including the event-based text on the touchscreen display.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities.

According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
    a housing including a first surface and a second surface facing away from the first surface;
    a touchscreen display exposed through a portion of the first surface;
    at least one communication circuit disposed in the housing, the communication circuit comprising a wired communication circuit or a wireless communication circuit;
    at least one processor electrically connected with the communication circuit and the touchscreen display and disposed in the housing; and
    a memory electrically connected with the processor and disposed in the housing, wherein the memory is configured to store a plurality of application programs including a first application program, and wherein the memory stores instructions that, when executed, enable the processor to:
    while the electronic device is not in electrical connection with an external display device;
    display a first plurality of icons indicating the plurality of application programs on the touchscreen display without displaying a bar, and
    when there is an event associated with the first application program, display a first notification including text based on the event on the touchscreen display; and
    while the electronic device is in electrical connection with the external display device via the communication circuit, enable the external display device to display the first plurality of icons and the bar, and when there is the event associated with the first application program;
    in a first operation, enable the external display device to display a second notification, at least partially, outside of the bar, the second notification appropriate for the external display device and including the text, and
    in a second operation, enable the external display device to display a third notification indicating the event but not including the text.

2. The electronic device of claim 1, wherein the third notification includes an icon in the bar.

3. The electronic device of claim 2, wherein the instructions enable the processor to blink the icon.

4. The electronic device of claim 1, wherein the first application program includes at least one of an email application program, a phone application program, a calendar application program, a reminder application program, a messenger application program, an SNS application program, and a texting application program.

5. The electronic device of claim 1, wherein when the electronic device is electrically connected with the external display device via the wired communication circuit, the instructions enable the processor to perform only the second operation.

6. The electronic device of claim 5, wherein when the electronic device is electrically connected with the external display device via a dock, the instructions enable the processor to perform only the second operation.

7. The electronic device of claim 6, wherein the instructions enable the processor to display the first notification on the touchscreen display.

8. The electronic device of claim 6, wherein the instructions enable the processor to display a fourth notification including the text on the touchscreen display, and wherein the fourth notification differs in at least one display attribute from the first notification.

9. The electronic device of claim 8, wherein the instructions enable the processor to display the fourth notification on a first area and to allow a second area of the touchscreen display to serve as a touch input device.

10. The electronic device of claim 1, wherein the first notification and the second notification have at least one different display attribute, and wherein the at least one different display attribute includes at least one of resolution, number of screens, direction of screen, position of displayed object on screen, brightness of screen, color of object, shape of object, contrast, or screen size.

11. The electronic device of claim 3, wherein upon receiving a select input for the icon, the instructions enable the processor to display the text on the external display device.

12. A non-transitory computer-readable recording medium storing instructions configured to perform at least one operation by a processor, the at least one operation includes:
    while an electronic device is not in electrical connection with an external display device;
    displaying a first plurality of icons indicating a plurality of application programs on a touchscreen display of the electronic device without displaying a bar, and
    when there is an event associated with a first application program, displaying a first notification including text based on the event on the touchscreen display; and
    while the electronic device is in electrical connection with the external display device, enabling the external display device to display the first plurality of icons and the bar, and when there is the event associated with the first application program:
    in a first operation, enabling the external display device to display a second notification, at least partially, at an outside of the bar, the second notification appropriate for the external display device and including the text, and
    in a second operation, enabling the external display device to display a third notification indicating the event but not including the text.

13. The non-transitory computer-readable recording medium of claim 12, wherein the third notification includes an icon in the bar.

14. The non-transitory computer-readable recording medium of claim 12, wherein the at least one operation further includes, after receiving the second information notification, receiving a message from a second device through a first device.

15. The non-transitory computer-readable recording medium of claim 12, wherein the first application program includes at least one of an email application program, a phone application program, a calendar application program, a reminder application program, a messenger application program, an SNS application program, and a texting application program.

* * * * *